US012253353B2

(12) United States Patent
Yacoubian

(10) Patent No.: US 12,253,353 B2
(45) Date of Patent: *Mar. 18, 2025

(54) SURFACE INSPECTION SENSOR

(71) Applicant: Araz Yacoubian, Encinitas, CA (US)

(72) Inventor: Araz Yacoubian, Encinitas, CA (US)

(*) Notice: Subject to any disclaimer, the term of this patent is extended or adjusted under 35 U.S.C. 154(b) by 264 days.

This patent is subject to a terminal disclaimer.

(21) Appl. No.: 17/881,780

(22) Filed: Aug. 5, 2022

(65) Prior Publication Data

US 2022/0381556 A1 Dec. 1, 2022

Related U.S. Application Data

(63) Continuation-in-part of application No. 17/557,124, filed on Dec. 21, 2021, now Pat. No. 11,408,832.

(60) Provisional application No. 63/133,403, filed on Jan. 3, 2021.

(51) Int. Cl.
*G01B 11/25* (2006.01)
*G01N 21/95* (2006.01)

(52) U.S. Cl.
CPC ........ *G01B 11/2522* (2013.01); *G01B 11/254* (2013.01); *G01N 21/9515* (2013.01)

(58) Field of Classification Search
CPC .......... G01N 21/8851; G01N 21/9515; G01N 2021/8812; G01N 2201/0221; G01B 11/2522; G01B 11/254

See application file for complete search history.

(56) References Cited

U.S. PATENT DOCUMENTS

| 10,254,252 | B2 | 4/2019 | Yacoubian | |
|---|---|---|---|---|
| 11,105,754 | B2 | 8/2021 | Yacoubian | |
| 2015/0022654 | A1* | 1/2015 | Greenberg | H01J 37/00 348/126 |

OTHER PUBLICATIONS

Alan V. Oppenheim and Ronald W. Schafer, Discrete-Time Signal Processing (Prentice Hall, New Jersey, 1989), pp. 547 and 548.
Max Born & Emil Wolf, Principles of Optics: Electromagnetic Theory of Propagation Interference and Diffraction of Light (Pergamon Press, Oxford, 1959), pp. 44 and 45.
David S. Kliger, James W. Lewis, and Cora E. Randall, Polarized Light in Optics and Spectroscopy (Academic Press, Boston, 1990), p. 242.

(Continued)

*Primary Examiner* — Jamil Ahmed
(74) *Attorney, Agent, or Firm* — James R. McDaniel

(57) ABSTRACT

Various surface and structural defects are currently inspected visually. This method is labor intensive, requiring large maintenance man hours, and is prone to errors. To streamline this process, herein is described an automated inspection system and apparatus based on several optical technologies that drastically reduces inspection time, provides accurate detection of defects, and provides a digital map of the location of defects. The technology uses a sensor that includes a pattern projection generator for generating a pattern image on the structural surface and a camera for detecting the pattern image generated by the pattern projection generator on the structural surface. Furthermore, the technology utilizes an image processing and correction apparatus for performing a pattern image and structural surface defect map correction and generate a distortion corrected defect map for a surface scan area on the structure that is incident on the sensor.

20 Claims, 38 Drawing Sheets

(56) References Cited

OTHER PUBLICATIONS

A. Yacoubian, Optics Essentials, (CRC Press, New York, 2015), pp. 50 and 51.
Eugene Hecht, Optics (Addison-Wesley Publishing, Massachusetts, 1987), p. 300.
R.J. Collier, C. B. Burckhardt, and L.I I. Lin, Optical Holography, (Academic Press, Boston, 1971), pp. 348 and 349.

* cited by examiner

SURFACE INSPECTION SENSOR

CROSS-REFERENCE TO RELATED APPLICATIONS

This application is a continuation-in-part of U.S. patent application Ser. No. 17/557,124, filed on Dec. 21, 2021, which is a continuation-in-part of U.S. Patent Application 63/133,403 filed on Jan. 3, 2021, the disclosures of which are hereby incorporated by reference in their entireties to provide continuity of disclosures to the extent such disclosures are not inconsistent with the disclosure herein.

BACKGROUND

Various surface and structural defects are currently inspected visually. This method is labor intensive, requiring large maintenance man hours, and is prone to errors. To streamline this process, herein is described an automated inspection system and apparatus based on several optical technologies that drastically reduces inspection time, provides accurate detection of defects, and provides a digital map of the location of defects.

SUMMARY

This present invention describes technology uses of multiple sensing/imaging modalities using: i) ring illumination angular scanning, ii) coherent speckle scanning, iii) multi-spectral imaging such as ultraviolet (UV), visible and infrared (IR) spectrums, and iv) using polarization detection. An overview of the approach is shown in FIGS. 1A and 1B. Furthermore, position registration is achieved by wireless (WiFi) triangulation, optical and ultrasonic distance measurements. The final outputs are combined to produce a surface, coating, and structure digital defects map on a 3D structure model. An overview of the approach and the sensor is depicted in FIGS. 1A and 1B. Each of these modalities detects different types and size of defects, as described herein. For example, ring illumination angular scanning (i) reveals defects were either part of, or the entire coating is removed, because reflectivity will have a different angular directionality. Comparing images with illumination incident at multiple angles increases defect detection accuracy drastically. In addition, an optimal signal is obtained at a given angle, and using multi-angle scanning enables defect detection without the need of high-precision angular alignment. Thus, a sensor based on the present invention can be used for hand-held inspection. The coherent speckle scanning (ii) measures micro-pits, voids, small/pinhole defects, cracks, and discontinuities on the surface of a coating and structure. Multi-spectral (UV, visible and IR) imaging (iii) is used for multi-material assessment to distinguish between defects at different material layers, and (iv) differential polarization detection reveals defects by detecting a variation in the surface finish such as the coating and the structure body. The data captured by the sensor is transferred to a handheld, portable display that includes the 3D model of the structure and shows both the completed scan areas and detected defects.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
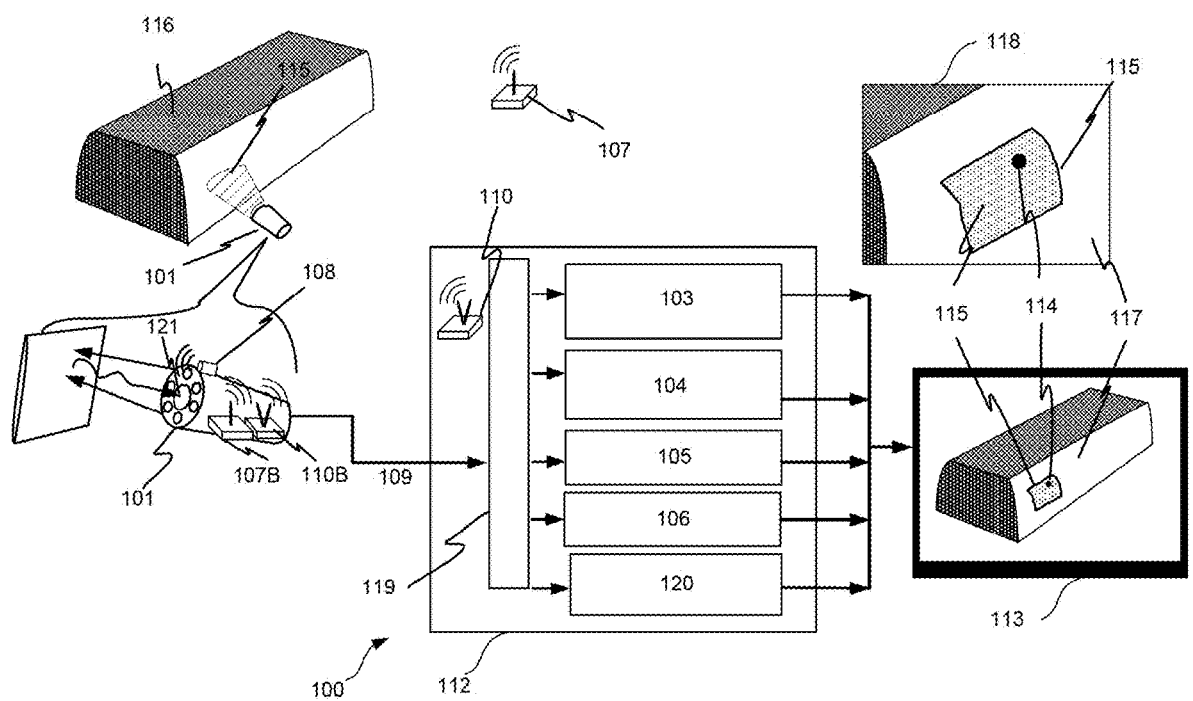
FIG. 1A is perspective pictorial and block diagrams illustrating an embodiment for automated inspection of structure.
Figure 1B:
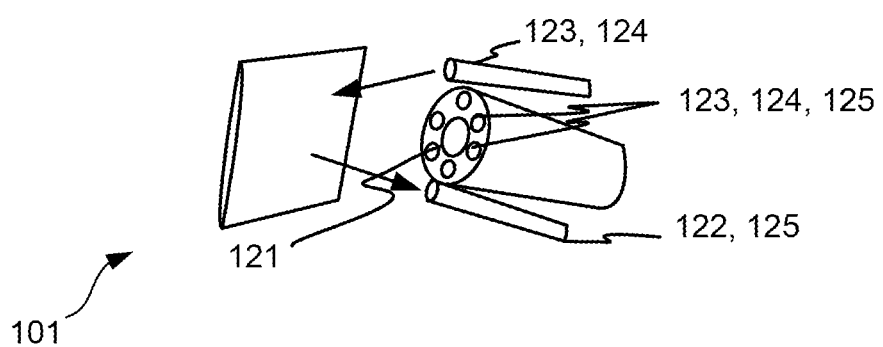
FIG. 1B is perspective pictorial and block diagrams illustrating an embodiment for a sensor head for surface inspection.

FIGS. 1A, 1B, 1C, 1D and 1E illustrate an overview of an automated inspection sensor unit and methodology. FIG. 1A is a pictorial block diagram illustrating a schematic of an automated inspection sensor unit and methodology 100 used for inspecting a relatively large structure of arbitrary shape 116 or a specimen. FIG. 1B is perspective pictorial and block diagram illustrating an embodiment depicting details of the sensor head 101, which is a handheld or portable/movable unit. FIG. 1A apparatus uses multiple parameters for inspection which include i) scanning radial or ring illumination 103 by sequentially pulsing each light source and detecting each angle which generates angular scan data, ii) coherent speckle illumination 104 generated by a combination of laser diodes, and scattering media, to detect very small defects, and iv) multi-wavelength imaging 105, where a combination of multi-wavelength LEDs are used for identifying defects in a structure, surface coating, and underlying material, and iii) polarization imaging 106 using polarization components that are mounted in front of the cameras, or using multiple adjacent cameras with polarizers oriented orthogonal to each other or at a different polarization angle from each other. Sensor unit position is obtained using wireless position receivers and transceivers (WiFi) 107. Further accuracy is achieved using ultrasonic range distance measurement finder 108 also attached to the sensor head to measure distance between sensor head and structure or specimen body, or an optical device, such as a light emitting diode or laser-based range finder, or a combination thereof. Data is transferred via wired 109 or wireless 110 transmission to a processor 112. Two wireless transceivers may be used, one transceiver 110B placed on the sensor head 101 and another transceiver 110 placed in the processor 112. The wireless transceivers used for positioning 107 are connected wirelessly to a wireless transceiver 107B placed on the sensor head, which moves with the sensor. One or more wireless transceivers 107 may be placed around the structure or object being tested. Digital display (either hand-held/portable or attached to the sensor unit) displays the section of the completed scan on a 3D structure model 113. The display also shows the location of defects 114, the completed scan area 115 displayed on the structure 116, and model 117, as depicted in FIG. 1A, and the details shown in the inset 118. The processor 112 is composed of pre-processor 119 to take raw sensor data, and combine the multiple inspection modalities 103, 104, 105, 106, and the position registration data 120 generated from positioning receivers and transceivers 107 and ultrasonic range distance measurement finder 108 apparatus. The sensor head 101 contains one or more cameras or image capturing apparatus 121, either centrally located, or off-centered 122 as indicated in FIG. 1B. Sensor head 101 contains coherent and incoherent optical sources (light sources) and optical components such as lenses, spectral filters and polarization controlling components 123 and 125, as well as single and multi-element optical detectors 124.

Figure 1C:
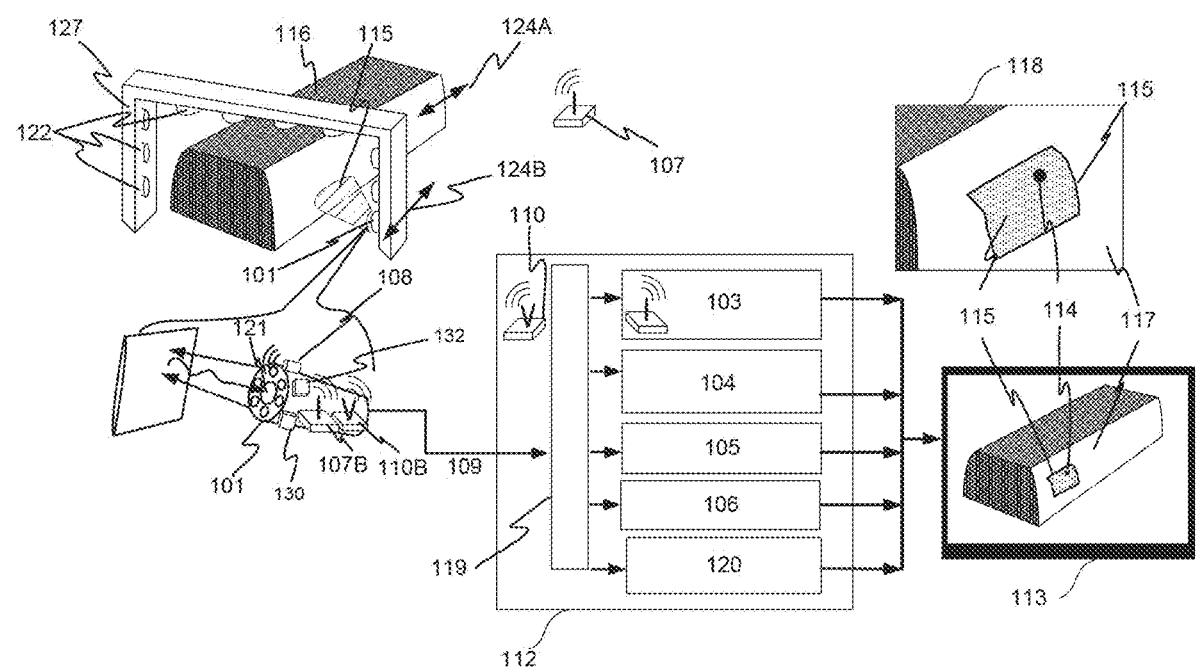
FIG. 1C is perspective pictorial and block diagrams illustrating an embodiment for a sensor head in an array configuration for surface inspection.

FIG. 1C is perspective pictorial and block diagrams illustrating an embodiment for a sensor head 101 in an array configuration for surface inspection utilizing a plurality of the sensors 101 in a sensor array configuration 122, attached to an array holder 127 or an apparatus that holds a plurality of sensors 101. This apparatus 123 is used to rapidly scan the entire structure 116. The rapid scanning is achieved either by a) setting the array holder 123 stationary and moving the structure 116 as depicted in the object movement 124A, or b) setting the structure 116 stationary and moving the array holder 127 in the sensor array movement direction 124B, or a combination thereof.

In some embodiments, the sensor head 101 contains various positioning registration sensors 130, such as an accelerometer-based sensor, an inertial mass sensor, a magnetometer, or a combination thereof to determine the viewing direction of the sensor head 101, determine a movement of the sensor head 101 with respect to the structure 116, determine an acceleration of the sensor head 101, determine a velocity of the sensor head 101, determine a movement distance of the sensor head 101, and determine a direction of movement of the sensor head 101, or a combination thereof. It should be obvious to those skilled in the art that velocity of the sensor head 101 is determined by integrating accelerometer data, and the movement distance of the sensor head 101 is determined by integrating velocity data. In other embodiments, sensor head 101 incorporates a device 132 that indicates direction, tilt and movement of the sensor head 101 by using an accelerometer, a gyroscope such as a fiber-optic gyroscope or a micro-electro-mechanical gyroscope, a magnetometer, or a combination thereof, including one or more of such devices.

A unique aspect of the present invention is that the embodiment for a sensor head 101 in FIG. 1C may optionally include wireless position receivers and transceivers (WiFi) 107 and 107B in order to more accurately obtain a position of the sensor head 101, as discussed above. In this manner, the wireless position receivers and transceivers (WiFi) 107 and the sensor array configuration 122, along with the array holder 127 can be used to more accurately obtain a position of the sensor head 101. However, it is to be understood that the sensor array configuration 122, along with the array holder 127 can be used on their own to accurately obtain a position of the sensor head 101.

Figure 1D:
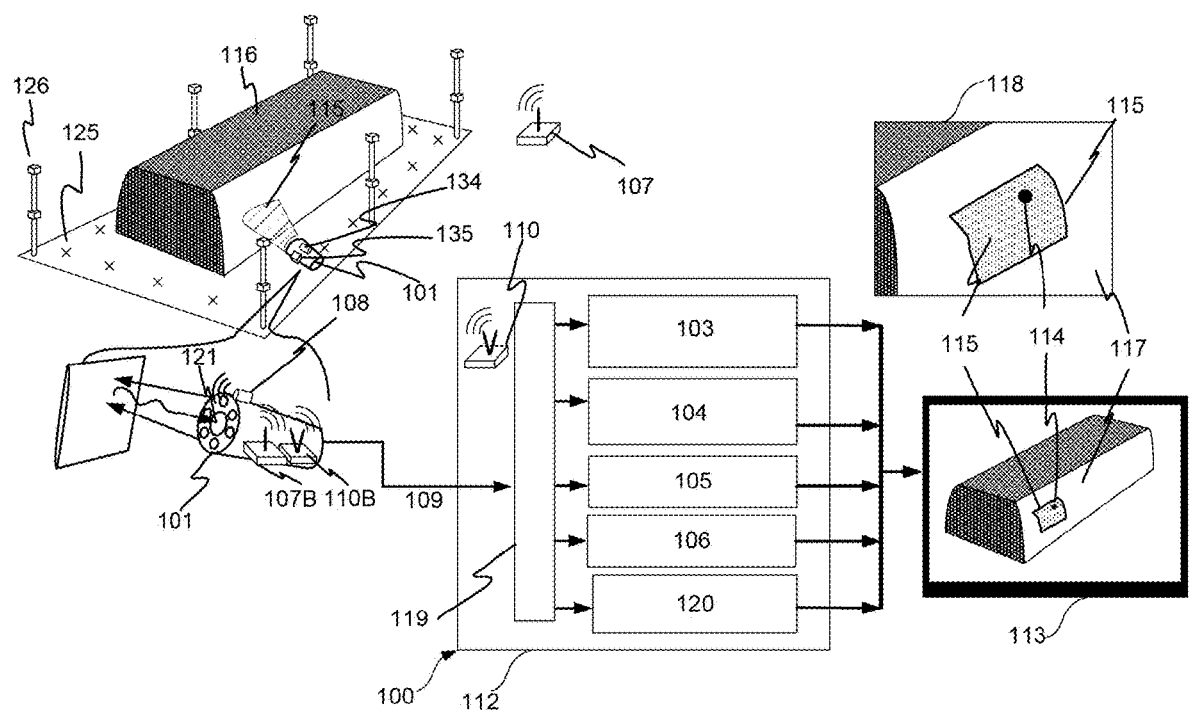
FIG. 1D is perspective pictorial and block diagrams illustrating an embodiment for a sensor head and positioning markings for surface inspection.

FIG. 1D is perspective pictorial and block diagrams illustrating an embodiment for a sensor head 101 utilizing stationary ground makers 125 and height markers 126 for determining the position of the sensor head 101 with respect to the structure 116. Utilizing the ground markers 125 and height markers 126, the sensor head 101 can be pointed to these markers and the position data recorded to reference the sensor head 101 position with respect to the structure 116.

In some embodiments similar to FIG. 10, the data obtained by pointing the sensor head 101 to the ground markers 125 and height markers 126 is combined with the distance measurements sensor such as ultrasonic range distance measurement finder 108, an optical or lased distance measurement sensor placed on the sensor head 101, an accelerometer based sensor attached to the sensor head 101, an inertial mass sensor or a magnetometer attached to the sensor head 101, a wireless positioning based sensor 107 and 107B attached to sensor head 101, or any combination thereof, to achieve an accurate determination of the sensor head 101 position with respect to the structure 116.

Another unique aspect of the present invention is that the embodiment for a sensor head 101 in FIG. 1D may optionally include wireless position receivers and transceivers (WiFi) 107 and 107B in order to more accurately obtain a position of the sensor head 101, as discussed above. In this manner, the wireless position receivers and transceivers (WiFi) 107 and 107B and the ground markers 125 and height markers 126 combined with the distance measurements sensor such as ultrasonic range distance measurement finder 108 can be used to more accurately obtain a position of the sensor head 101 with respect to structure 116. However, it is to be understood that the ground markers 125 and height markers 126 combined with the distance measurements sensor such as ultrasonic range distance measurement finder 108 can be used on their own to accurately obtain a position of the sensor head 101 with respect to structure 116.

In some embodiments similar to FIG. 1D, the sensor head 101 contains a laser source 134 or a light source that produces a small point, a cross, a circular mark, or an arbitrary light shape to enable accurate pointing and centering of the sensor head 101 towards the ground markers 125 and height markers 126.

In other embodiments similar to FIG. 1D, the sensor head 101 contains additional optical sensors or imaging sensors directed at multiple orientations that record the position of sensor head 101 by utilizing the ground markers 125 and height markers 126 without the need to point the sensor head to each marker.

In some embodiments similar to FIG. 1D, one or more cameras 135 are attached to the sensor head 101 to detect the position of the sensor head with respect to the ground markers 125 and height markers 126 using image registration.

Figure 1E:
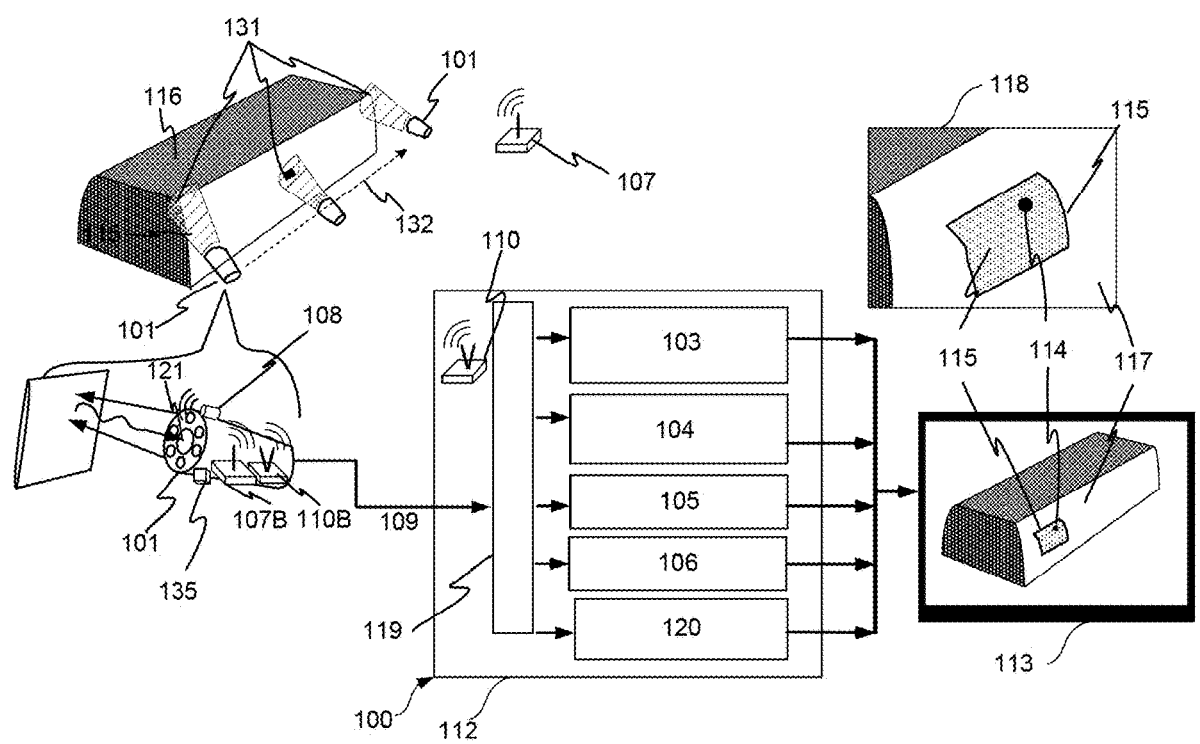
FIG. 1E is perspective pictorial and block diagrams illustrating an embodiment for a sensor head for surface inspection along various points on the structure.

FIG. 1E is perspective pictorial and block diagrams illustrating an embodiment for a sensor head 101 for surface inspection by referencing along various points on the structure 116 such as edges, corners, surface features 131 and surface markings for determining the inspection position of sensor head 101 with respect to the structure 116. By utilizing various points on the structure 116 such as edges, corners, surface features and markers 131, the sensor head 101 can be pointed to reference points and record the position data to reference the sensor head 101 position with respect to the structure 116.

In some embodiments similar to FIG. 1E, the data obtained by pointing the sensor head 101 to various points on the structure 131 is combined with a distance measurements sensor such as ultrasonic range distance measurement finder 108, an optical or lased distance measurement sensor placed on the sensor head 101, an accelerometer based sensor attached to the sensor head 101, an inertial mass sensor or a magnetometer attached to the sensor head 101, a wireless positioning based sensor 107 and 107B attached to sensor head 101, or any combination thereof, to achieve an accurate determination of the position of the sensor head 101 with respect to the structure 116.

Another unique aspect of the present invention is that the embodiment for a sensor head 101 in FIG. 1E may optionally include wireless position receivers and transceivers (WiFi) 107 and 107B in order to more accurately obtain a position of the sensor head 101, as discussed above. In this manner, the wireless position receivers and transceivers (WiFi) 107 and 107B and the distance measurements sensor such as ultrasonic range distance measurement finder 108, the optical or lased distance measurement sensor placed on the sensor head 101, the accelerometer-based sensor attached to the sensor head 101, the inertial mass sensor or a magnetometer attached to the sensor head 101 can be used to more accurately obtain a position of the sensor head 101 with respect to structure 116. However, it is to be understood that the distance measurements sensor such as ultrasonic range distance measurement finder 108, the optical or lased distance measurement sensor placed on the sensor head 101, the accelerometer based sensor attached to the sensor head 101, the inertial mass sensor or a magnetometer attached to the sensor head 101 and the ground markers 125 and height markers 126 combined with the distance measurements sensor such as ultrasonic range distance measurement finder 108 can be used on their own to accurately obtain a position of the sensor head 101 with respect to structure 116.

In some embodiments similar to FIG. 1E, a camera 135 is attached to the sensor head 101 to detect the position of the sensor head 101 with respect various points on the structure 116 such as edges, corners, surface features and markers 131 using image registration.

In some embodiments similar to FIGS. 1C and 1D, the camera used for generating the defect map, as described herein are used for detecting position of the sensor head 101 with respect to the ground markers 125 and height markers 126.

In some embodiments similar to FIGS. 1A and 1B, position detection devices are used for transferring captured data to structure coordinates. In other embodiments, ultrasonic range finders 108 are used for position measurements.

In some embodiments similar to FIGS. 1A and 1B, position detection devices are comprised of wireless, ultrasonic, or optical transceivers, or a combination thereof.

In some embodiments similar to FIGS. 1A and 1B, when multiple position detection devices, such as multiple wireless transceivers 107 are used, the data from theses transceivers is a triangulation method is utilized to determine the position of the sensor head 101.

In some embodiments similar to FIGS. 1A and 1B, the multiple position transceivers 107 may be connected wirelessly, wired, or a combination thereof.

In some embodiments similar to FIG. 1C, the array holder 127 movement is measured using a sensor such as an encoder, a laser distance measurement sensor, a rolling element encoder, or any number of contact or non-contact encoder elements.

In some embodiments similar to FIG. 1C, the movement of the structure 116 is measured by placing it on a roller or conveyer belt to move 124A.

In some embodiments similar to FIG. 1C, the movement of the structure 116 is measured using an accelerometer, an optical or a laser distance measurement sensor or a linear encoder attached on the structure 116. In another embodiment similar to FIG. 1C, the movement of the structure 116 is measured using an optical or a laser distance measurement sensor that is placed at a fixed position external to the structure and pointed to the structure.

In some embodiments similar to FIG. 1C, positioning registration sensors 130 and device 132 that indicates direction, tilt and movement of the sensor head 101 are combined into a single sensor device.

Figure 2A:
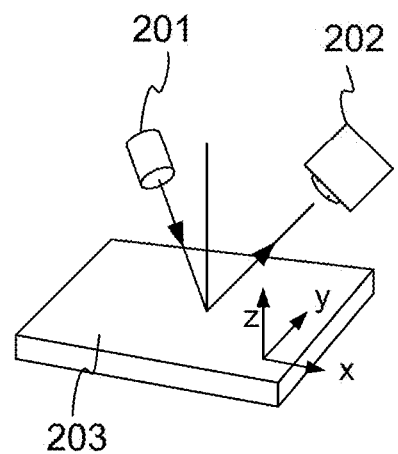
FIGS. 2A-2C are perspective pictorial and block diagrams illustrating an embodiment that describes angular scanning illumination
Figure 2B:
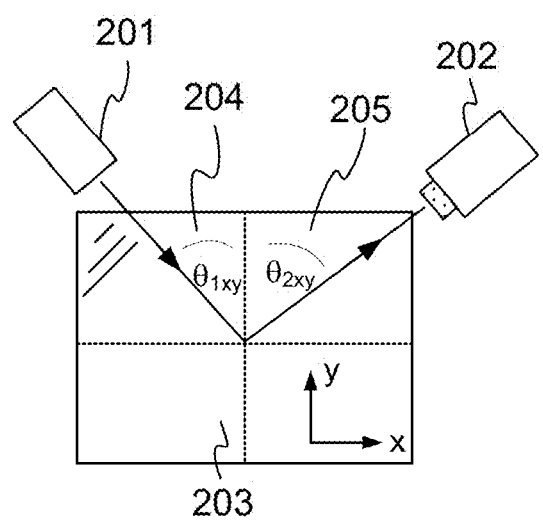
Figure 2C:
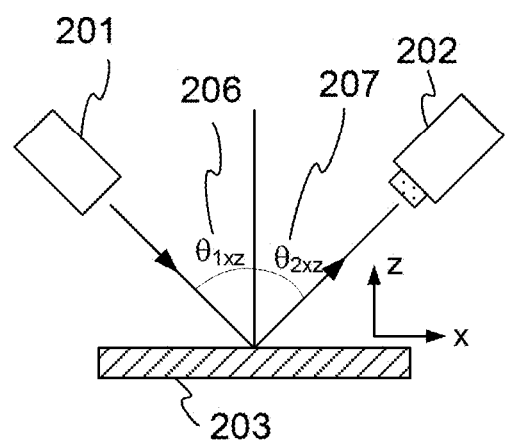

FIGS. 2A to 2C are perspective pictorial and block diagrams illustrating an embodiment that describes angular scanning illumination. FIG. 2A depicts a perspective light source 201 that is positioned at an arbitrary angle of incidence with respect to camera 202, thereby detecting defects at that angle. FIG. 2B is the top view indicating the variation in the angles in radial direction, and FIG. 2C is the side view of the detection, indicating variations in the vertical angular direction 207. FIGS. 2B and 2C depict light source 201, camera 202, specimen 203 or the surface being tested, incident angle in planar x-y directions 204 and reflected or scattered angle in vertical x-y direction 205, reflected or scattered angle in planar x-y direction 202, incident angle in vertical x-z direction 206, and reflected or scattered angle in vertical x-z direction 207. The specimen 203 can be a large structure or a small object.

In some embodiments, the light source 201 and the camera 202 are at fixed positions. In other embodiments, the light source 201 or the camera 202, or both are shifted mechanically. Yet in other embodiments multiple light sources, multiple cameras, or a combination of both are placed at various angular positions, and when the light source 201 is turned on simultaneously or sequentially, the cameras capture is turned on simultaneously or sequentially, or a combination thereof. Yet in other embodiments, the various light source and camera turn on time and capture time are synchronized to produce images and detection data at various detection angles.

Since reflection between multiple layers has different angular characteristics, such as different angles of scattering, and different reflections, defects such as voids, cracks, bulging and gaps, or large gaps in the lines can be detected using angular scanning illumination.

It is to be understood that the terms angular and radial are used interchangeably throughout this application.

In some embodiments, sensor arrangements described throughout this application and depicted in FIGS. 1A and 1B and 2A-2C, angular scan refers to either radial angle, namely in the x-y direction depicted in FIG. 2A, or vertical angle, namely in the x-z direction depicted in FIG. 2A, or a combination of both, namely at any arbitrary angle in the direction. The terms angular and radial are used interchangeably throughout this application.

Figure 3:
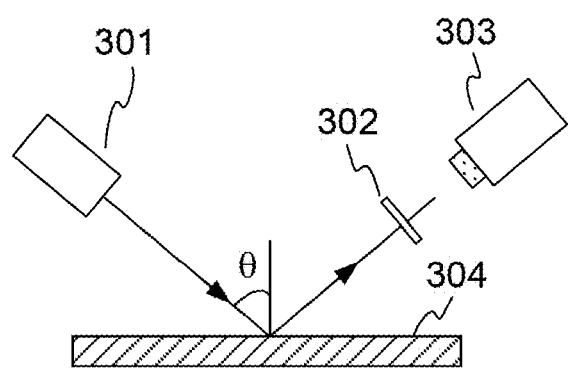
FIG. 3 is a perspective pictorial and block diagram illustrating an embodiment for polarization imaging.

FIG. 3 is a perspective pictorial and block diagram illustrating an embodiment for polarization imaging using a light source 301 illuminating a specimen 304, and a camera 303 with a polarizer 302 placed in front of the camera 303. In alternative embodiments, the light source 301 can be polarized, randomly polarized or circularly polarized. In other embodiments, a polarizer, a wave plate, or a combination of both are used in front of the light source 301 to control the state of the incident light polarization.

FIGS. 4A to 4F are perspective pictorial and block diagrams illustrating an embodiment depicting various methods of simultaneously detecting multiple polarization states. FIGS. 4A to 4F depict beam splitter 401, polarizer 402, camera 403, polarization 404, imaging lens 405, lens or lenslet array 406, polarizer array 407, focal plane array 408, multiple images each for different polarization state 409, polarizer fine array 410, and each pixel or cluster of pixels represent different polarization state 411.

Figure 4A:
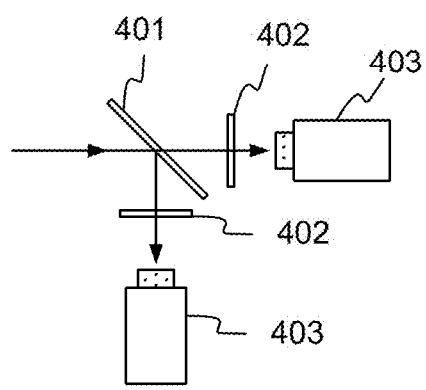
FIGS. 4A-4F are perspective pictorial and block diagrams illustrating various multi-state polarization detection methods and apparatus.
Figure 4B:
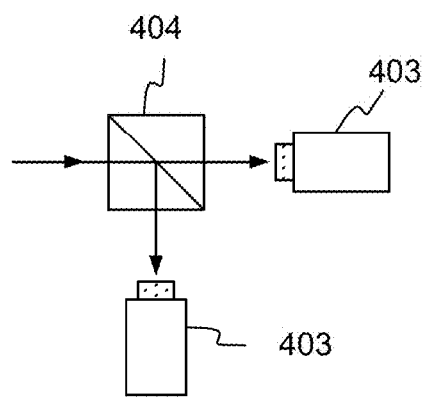
Figure 4C:
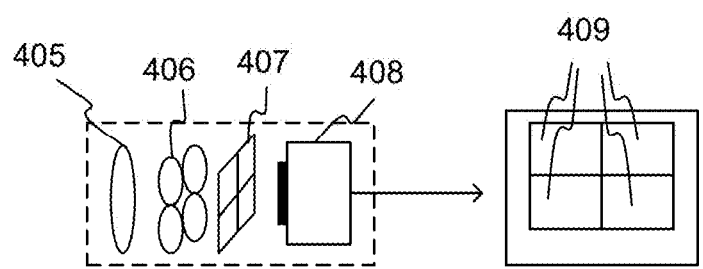
Figure 4D:
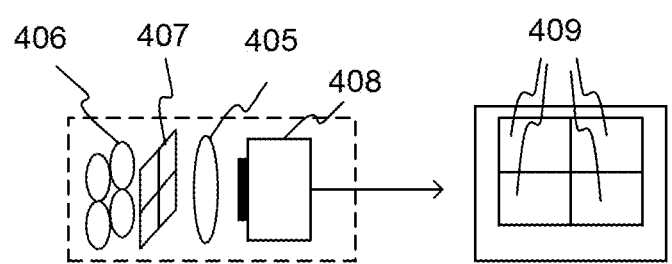
Figure 4E:
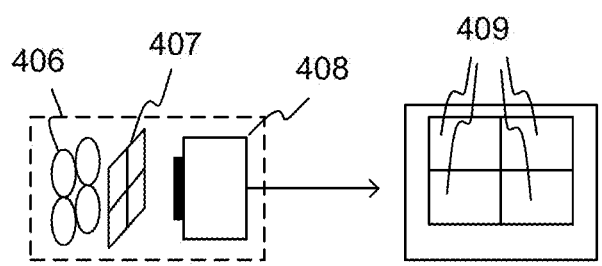
Figure 4F:
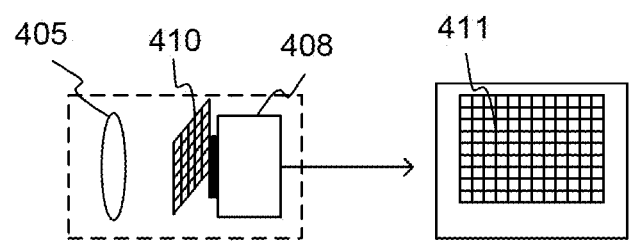

FIG. 4A depicts using a beam splitter 401, such as a reflective plate beam splitter, a cube beam splitter, or a diffractive beam splitter, combined with polarizers in front of each camera. FIG. 4B depicts using a polarization beam splitter. FIGS. 4C to 4E illustrates use of lens array and polarizer arrays to capture multiple polarization states. FIG. 4F illustrates use of a fine polarizer array in front of the camera 403 or embedded on the camera chip to produce multiple state polarization images. In an alternative embodiment similar to FIGS. 4A and 4B, focusing lenses are placed in front of each camera after the beam splitter. Yet in another embodiment similar to FIGS. 4A and 4B, a focusing lens is placed before the beam splitter resulting in focused images on both cameras. In various embodiments similar to FIGS. 4A to 4F, the images are combined digitally to determine various polarization states, indicate the difference in between states, and shift the images for overlap of the images, or a combination thereof.

Figure 5A:
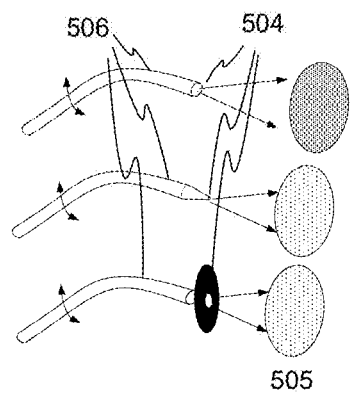
FIGS. 5A-5D are perspective pictorial and block diagrams illustrating various embodiments for generating speckle illumination.
Figure 5B:
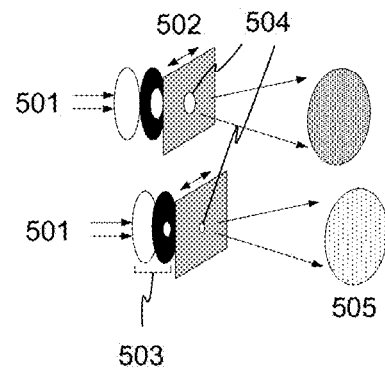

FIGS. 5A to 5D show various methods of generating illumination of different speckle sizes. In FIG. 5A, a diffuse media combined with aperture control generates speckles of a desired size. In FIG. 5B, multi-mode fibers of different diameters (or using fiber tapers) are used to generate speckles of different size.

FIGS. 5A to 5D show two types of apparatus to generate coherent illumination 501 for defect detection. Speckle size 505 is controlled using aperture control and diffuse media (FIG. 5A), and using a multi-mode fiber of different sizes (FIG. 5B). To remove speckle noise from the image, the random media or the multi-mode fiber can be moved during image acquisition. FIGS. 5A and 5B depict a coherent light source 501, a moving diffuser 502, optics and iris 503, and controlled aperture 504. The apparatus controls the speckle size 505 and incorporates a moving fiber 506 that reduces the speckle noise in the detected image.

In the apparatus shown in FIGS. 5A to 5D, several coherent sources are used (such as laser diodes) in conjunction with speckle generation apparatus. Each source generates a particular range of sizes of speckles. The source is combined either with optics and random media as shown in FIG. 5A or coupled to mufti-mode fibers of different apertures as shown in FIG. 5B. When using multi-mode optical fibers, either fibers of different diameters are employed, or the aperture is controlled using fiber tapers. An example of fiber tapers is illustrated in FIG. 5A.

Figure 5C:
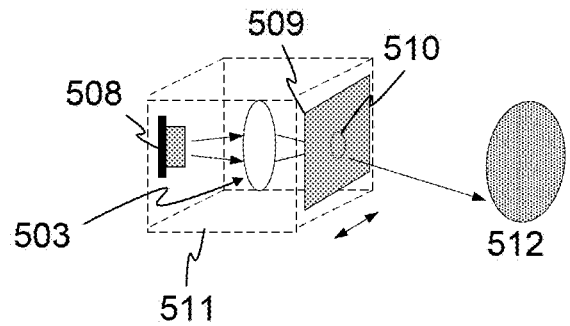
Figure 5D:
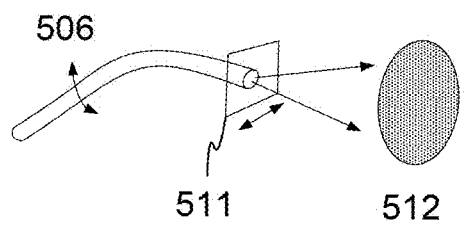

FIGS. 5C and 5D show two types of apparatus to generate coherent illumination for small defect detection. Speckles are generated using diffuse media (FIG. 5C), and using a multi-mode fiber (FIG. 5D). To remove speckle noise from the image, the diffuse media or the multi-mode fiber is moved rapidly. To minimize false detection, the speckle generation apparatus is spatially modulated, as described herein. FIGS. 5C and 5D depict optics and iris 503, fast moving fiber 506, laser diode (LD) 508, fast moving diffuser 509, illuminated spot of light on the diffuser 510 by LD, spatially modulated speckle generator 511, and speckle illumination 512.

To remove speckle noise from the image, the random media or the multi-mode fiber is moved during image acquisition.

In some embodiments similar to FIGS. 5A to 5D, the coherent source, is a laser diode, a super luminescent source, a light emitting diode (LED), a light source or an LED with a narrow band wavelength filter placed in front of it or in the optical path, a gas laser, a solid-state laser, or any other coherent or partially coherent source.

To reduce speckle noise from the image while maintaining the advantage of granularity detection, either the random media, or the multi-mode fiber as shown in FIGS. 5A to 5D are conventionally moved to smooth the detected image. Examples of speckle noise reduction are shown in FIGS. 11A and 11B.

Figure 6:
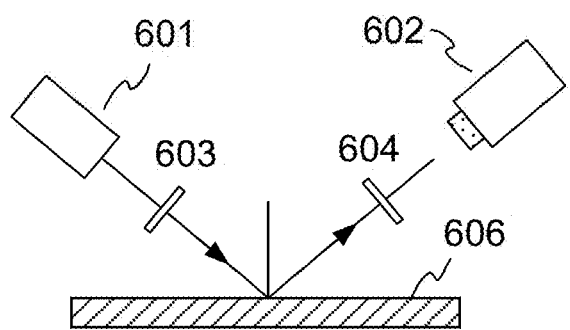
FIG. 6 is a perspective pictorial and block diagram illustrating an embodiment for multi-wavelength imaging.

FIG. 6 is a perspective pictorial and block diagram illustrating an embodiment for multi-wavelength imaging using spectral filters placed in front of the light source and in front of the cameras. Multi-wavelength measurements are achieved using multi-color LEDs combined with monochrome cameras, or using white light sources combined with color filters, as depicted in FIG. 6. FIG. 6 depicts light source 601, camera 602, filter 1 603, filter 2 604, and specimen 606.

For the apparatus depicted in various figures in the present invention, it is to be understood that the camera image is digitized, transferred to a computer, and image processing and computing are conventionally performed.

Figure 7:
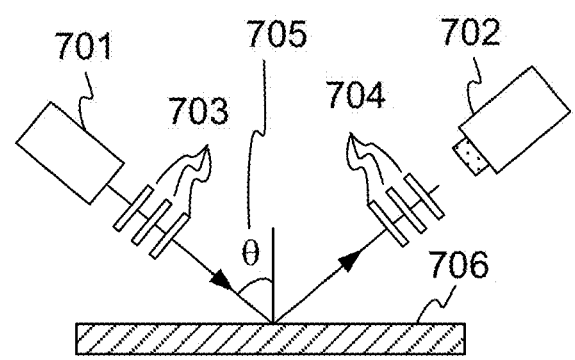
FIG. 7 is a perspective pictorial and block diagram illustrating a multi-wavelength polarization imaging.

FIG. 7 is a perspective pictorial and block diagram illustrating spectral or multi-wavelength polarization imaging using a combination of polarizers, wave-plates, and spectral filters. In some embodiments, only linear polarizers are used in front of the camera 702. In other embodiments, polarizers are used in front of the light source and in front of the camera. Yet in other embodiments, wave-plates are added to control the polarization state, from linear to elliptical to circular. FIG. 7 depicts light source 701, camera 702, polarizer, wave plate and filter 703 placed in the incident light path, and a polarizer, wave plate and filter 704 placed in the reflected or scattered light path from the specimen 706, at an incident angle θ705.

In some embodiments similar to FIGS. 6 and 7, a monochromatic light, a laser, a white light, a broad spectral light with a spectral filter in front of it, or a spectral filter are used. In other embodiments a filter in front of the camera, or a color camera, or a combination thereof are used.

Figure 8A:
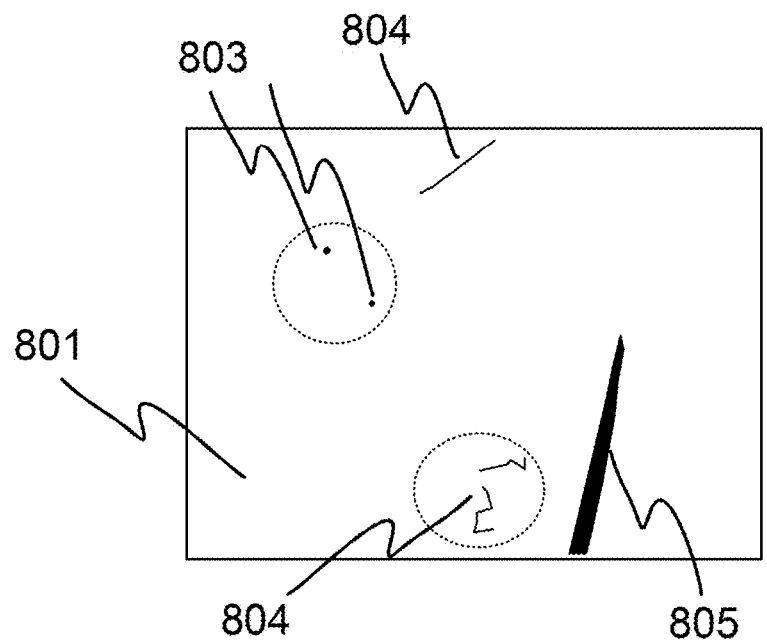
FIGS. 8A and 8B are pictorial diagrams illustrating angular illumination scanning defect detection.
Figure 8B:
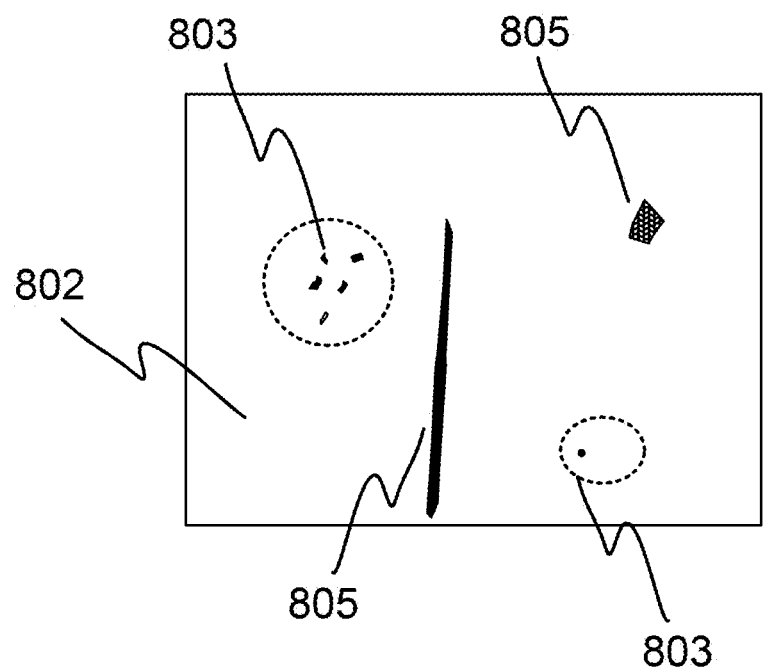

FIGS. 8A and 8B are pictorial diagrams of defect maps that result from angular illumination scanning. This scanning reveals various types of defects on various substrates and coatings such as A) a metal plate coated with a gray paint 801 depicted in FIG. 8A, and on B) a black plastic substrate coated with black paint 802 depicted in FIG. 8B. Detected defects shown in FIGS. 8A and 8B are pinholes 803, a shallow scratch 804 on surface, and a deep scratch 805 down to the plate or substrate.

Figure 9A:
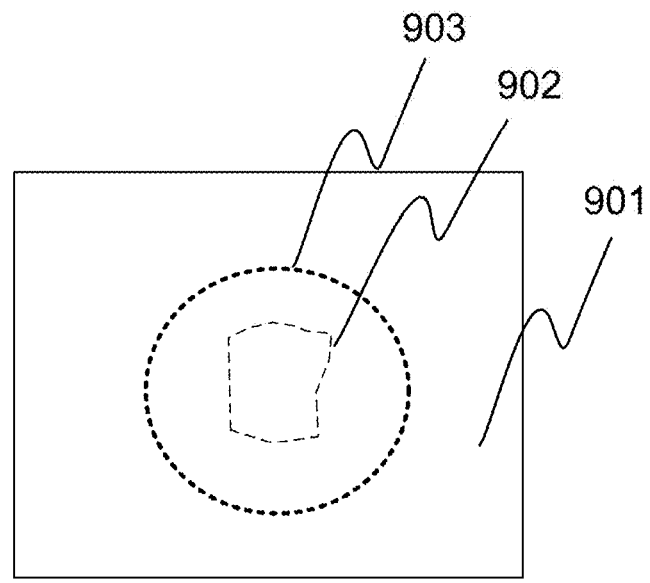
FIGS. 9A and 9B are pictorial diagrams illustrating differential polarization defect detection.
Figure 9B:
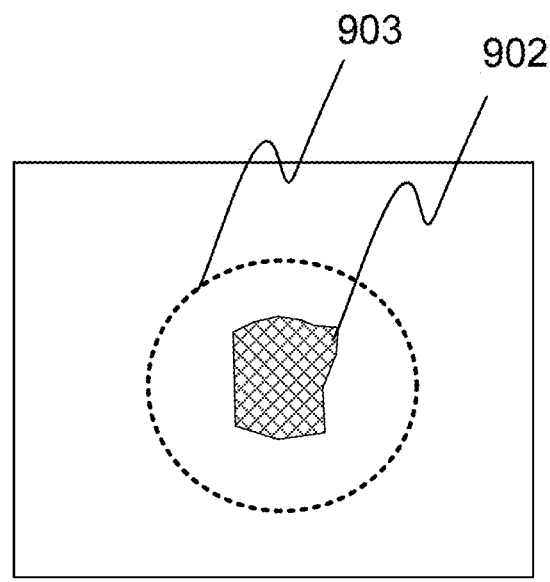

FIGS. 9A and 9B are pictorial diagrams of defect maps illustrating use of differential polarization imaging to reveal a layer of rectangular spot that has a different finish than the surrounding spray coated finish of the surface. The rectangular area mimics a layer of a different finish, such as due to damage to the surface or a defective surface. FIG. 9A shows an image using conventional photography, such as a flash photography, of a flat-gray spray coated substrate 901 with a rectangular section 902 inside the dotted circle 903 that has a polished surface to mimic a layer of a different finish. It is to be understood that the rectangular section 902 is not observable by conventional photography. In contrast, FIG. 9B depicts differential polarization detection, where it reveals a rectangular polished spot 902 inside the dotted circle 903 that has a different surface finish than the surrounding area.

Figure 10A:
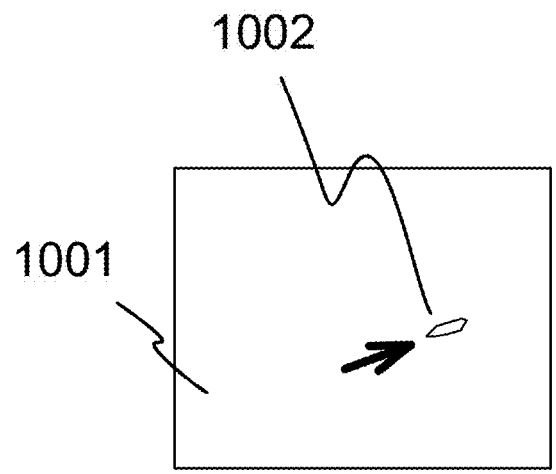
FIGS. 10A-10C are pictorial diagrams illustrating coherent speckle scanning defect detection.
Figure 10B:
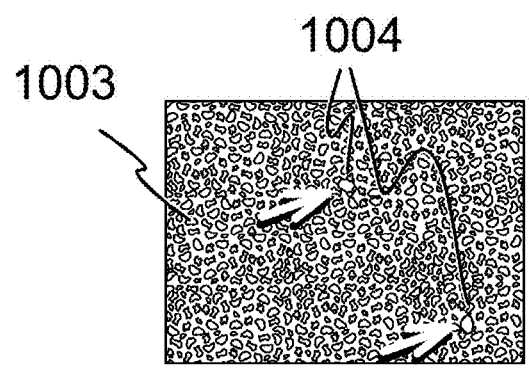
Figure 10C:
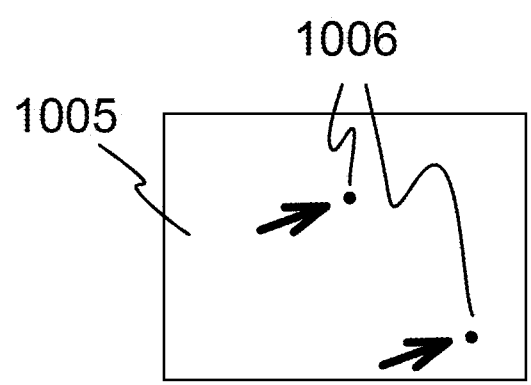

FIG. 10A to 10C are pictorial diagrams illustrating use of coherent speckle scanning imaging with different speckle sizes to reveal defects. FIG. 10A illustrates a microscopic image of a defect 1002 on a surface 1001. FIG. 10B depicts detection of two defects 1004, one of which is shown in FIG. 10A, using coherent speckle scanning method. The defect map shown in FIG. 10B results using coarse speckle size that is large compared to the defect size. Utilizing large speckles compared to the defect size results in a defect map with a background with speckle noise 1003. FIG. 10C depicts coherent speckle scanning imaging with fine speckle size, namely on the order of or smaller than the defect size, which results in a defect signature 1006 with a minimum background noise 1005. Arrows in FIGS. 10A to 10C point to the position of the defects. Image width of FIGS. 10B and 10C are approximately 3 times the image width of FIG. 10A. As illustrated in FIGS. 10A to 10C, being able to control the speckle size as depicted in FIGS. 5A to 5D enable increasing the signal-to-noise ratio of detection.

Figure 11:
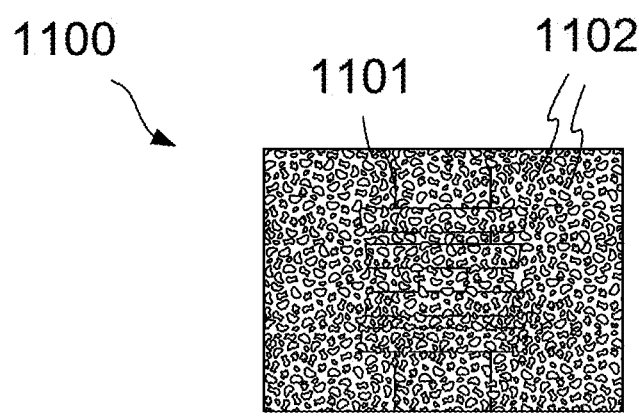
FIGS. 11A and 11B are pictorial diagrams showing images and data that illustrate image improvement by using speckle noise reduction techniques.
Figure 11:
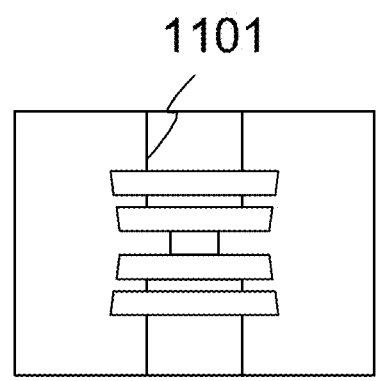

FIG. 11 shows an example of speckle noise reduction 1100 while imaging a specimen 1101, and speckle noise 1102. When the fiber or diffuser depicted in FIGS. 5A to 5D is stationary, the image produced is very noisy as indicated in FIG. 11A. When the diffuser or multi-mode fiber are moving rapidly, the speckle noise is minimized or removed, and the specimen 1101 or the surface being tested is imaged with clarity, as depicted in FIG. 11B.

Technical Approach i) Ring Illumination Angular Scanning

FIGS. 1A and 1B illustrate light sources 123 and 125 such as light emitting diodes (LED), laser or optical fibers positioned as a ring on the outer edge of the sensor unit such that they produce an illumination at different radial angles of incidence. A camera 121 at the center of the device captures the light image from surface that is being inspected. Each light source covers a narrow range of radial angles, and a combination of multiple light sources produce a full range of angular measurements as depicted in FIGS. 1A and 1B. The light sources are rapidly sequenced to produce multi-radial scan images captured by the camera.

Defects such as pinholes, scratches, missing or damaged coating, and areas with chips, scratches and cracks have different angular reflection characteristics than surrounding smooth coating areas. Therefore, the scanning radial illumination measurements reveal these defects. For example, a non-damaged surface produces angle of reflection $\theta_r$, that is equal to angle of incidence, $\theta_i$. Namely $\theta_i=\theta_r$. Local variations in coating surface angles due to defects produce brightness variations in the image. Additionally, non-smooth surfaces produce reflection/scattering at wider range of angles.

For example, when there is a missing portion of the coating, reflection from the coated layer and the underlying layer will have different reflectivity. This difference has specific angular sensitivity and by scanning various angles of incidence, the optimal signal is obtained. It should be noted that reflected image for each radial angle ($\theta_r$) illuminated image, $I_R(x, y, \theta_r)$, reveals the directionality of the defect with respect to the illumination angle, and provides critical knowledge of the defect location and orientation. For a quality assurance however, and overall defect map can be obtained, $I_{RTot}(x,y)$, by integral all the angular scans, namely:

$$I_{RTot}(x,y)=\int I_R(x,y,\theta_r)d\theta_r. \quad \text{(Eq. 1)}$$

Furthermore, small differences between the coated and damaged areas are revealed by comparing various angular scans. Digitally this is achieved using one of several digital processing techniques, such as comparing normalized difference between two or more images, performing correlation or convolution in the spatial domain, or multiplication in the Fourier domain.

FIGS. 8A and 8B depict a scanning illumination principle. FIG. 8A depicts defect detection on a metal surface coated with gray paint. Scratches and pinholes are present on the coated surface, some are deep enough to penetrate to the metal and others are shallow scratches only on the surface of the coating. Sequential angular illumination scanning and digitally processing reveals a wide variety of defects as depicted in FIG. 8A, from large areas 805 where paint is removed, to pinholes 803 and shallow scratches 804 on the surface. In contrast, if a single-source illumination imaging was used, only large scratches would be revealed. FIG. 8B depicts defect detection on a black plastic plate coated with a black paint that contains shallow and deep defects. The scanning illumination method reveals a wide range of defects as depicted in FIG. 8B. Even if the substrate and coating are the same color, angular illumination scanning reveals a variety of defects of different size and depth.

ii) Differential Polarization Imaging

Polarization measurements can distinguish between different types of surface finish or surface angle and reveal damaged coating or distinguish a coated surface and an area with coating removed. Parallel and perpendicular polarized light have different reflectivity for a dielectric surface, and this difference depends on the angle of incidence. Using two polarization states, such as vertical- and horizontal-linear polarization states, or right- and left-handed circular polarization states, will reveal differences in surface finish and defects, particularly when images obtained from the two states are subtracted as demonstrated. Two or more polarization state measurements are achieved by several methods, such as using rotating polarizers in front of a camera, using two cameras next to each other with polarizers placed in front of them at vertical and horizontal orientation, or using a polarization beam splitter directing light to two different cameras, or polarization control devices such liquid crystal light valves, or any other polarization control devices.

Polarization detection often requires large angles. For a dielectric surface, angles in the vicinity of 57° of incidence would work optimally. This however requires either having the sensor unit very close to the surface or having a source and a detector that are far apart. In order to enable a compact sensor apparatus that can work in a wide range of distances (e.g., from few inches to few feet from the surface being inspected), then differential polarization can be utilized. Namely, instead of using a single polarization state, two or more polarization states are used. For example, s- and p-polarization states are used, and image differences between the two states are calculated. This approach increases signal to noise ratio drastically, thereby allowing detection at smaller angles of incidence, and therefore a compact sensor apparatus works in a wide range of distances from the surfaces.

FIGS. 9A and 9B depict polarization-based defect detection to illustrate discrimination between two different surfaces, such as an underlying layer and an outer coating paint. A rectangular section 902 of a flat gray painted surface 901 has a polished section to mimic different surfaces that have different reflectivities than the coating. This may also represent damage to a surface. Using conventional photography, the polished section is not distinguishable from the rest of the sample as depicted in FIG. 9A. Using a differential polarization technique however clearly reveals the polished section as depicted in FIG. 9B. The dotted circles 903 in FIGS. 9A and 9B indicate the location of the polished section.

iii) Coherent Speckle Scanning

FIG. 5A to 5D depict methods of generating coherent speckle illumination. Speckle noise is often a nuisance in coherent imaging applications. But it is the advantage of coherent illumination that very small variations in coating surface, such as voids and pits can be detected by utilizing speckle illumination. Because of its coherence characteristics, laser illumination results in speckle pattern when it passes through a diffuse media. Speckle size dependents on the random distribution of the diffuse media, and aperture size or the illumination spot incident on the coating media. When this diffuse illumination pattern is incident on a coating surface with areas that contain pits, voids, or small defects on the order of the speckle size, a very bright signal is detected by the camera viewing the illuminated part. Therefore, small defects can be detected by this method. Another method of generating a speckle illumination is using a multi-mode fiber as depicted in FIG. 5B.

The captured image using speckle illumination however will be very noisy, which is a characteristic of coherent illumination. To reduce speckle noise from the image while maintaining the advantage of coherent detection, either the random media, or the multi-mode fiber are moved as depicted in FIGS. 5A-5D to smooth the detected image.

FIGS. 10A-10C illustrate detection of defects using speckle illumination on metal plate coated with paint and having small defects. Speckles are generated by a laser light incident on a moving diffuser as indicated in FIGS. 5A-5D, and speckle size is controlled by the illumination aperture. Two speckle sizes illuminations are compared, one coarse and the other fine. For small defects, fine speckles result in better detection of the defects than coarse speckle illumination as depicted in FIG. 10B and FIG. 10C.

Coherent illumination will generate an image that is full of speckle noise which makes it difficult to separate the signal from the defective area from noise. To overcome this, a speckle noise reduction technique using a rapidly moving diffuser or moving a multi-mode optical fiber is employed. Even though the speckle pattern is moving, it will still reveal the defects, but noise in the image will be significantly reduced.

FIGS. 11A-11B depict an example of speckle noise reduction techniques for image improvement. These techniques utilize either a moving scattering media or a vibrating multi-mode fiber-optic apparatus.

iv) Multi-Spectral Imaging

Multi-spectral [ultraviolet (UV), visible and infrared (IR)] imaging detects defects by detecting differences between the spectral response on the structure surface or the surface coating and the damaged area, such as if the underlying layer is exposed. Multi-spectral measurements are achieved using a) multi-wavelength light emitting diodes (LEDs), laser diodes (LD) combined with monochrome cameras, b) using white light or broad spectral band light sources with multi-channel cameras with red, green, blue and infrared (IR) outputs, c) using multiple LD, LED sources, or broad spectral band light sources combined with filters, or a combination thereof. In some embodiments, the filter can be a fixed filter, or a tunable filter, such as a liquid crystal tunable filter, or a combination thereof. In other embodiments the light source can be turned on simultaneously, sequentially, or a combination thereof.

v) Converting Scan Data to Defect Map

To register the defect position relative to surface features and the structure coordinates, a wireless position apparatus is used. Two or more wireless transmitters are placed at a prescribed location (either permanently placed in the inspection area or placed at a distance from a reference feature on the structure). Attached to the transceiver 110B is wireless transceiver 107B used to triangulate the position of the sensor. Using this method allows detection accuracy of a few centimeters. Position accuracy is further enhanced using other positioning sensors incorporated on the same positing electronics. An example of additional positioning sensor is using an ultrasonic transducer that measures distance from the sensor head 101 to the structure surface, optical distance measurement sensors, accelerometer and gyroscope-based position and orientation sensors. Measuring the distance between the sensor head 101 and the structure surface determines the size of the image.

In an alternative embodiment, the wireless transceiver 107B contains sensor that detects, pitches, yaw, or arbitrary angle. In some embodiments, an accelerometer-based sensor is incorporated to the sensor head.

The scanned data is transferred via an electrical wired connection or wireless communication (WiFi) and saved in a digital format which is then used to locate and repair the defects with ease. An electronic processor is used that enables position detection as well as data transfer of the sensor head scan data to a processing and display electronics.

A WiFi position detection unit such as wireless position receivers and transceivers (WiFi) 107 can be used to transfer captured data to structure coordinates. The WiFi position detection unit has transmitter and receivers.

vi) Additional Inspection Structures

Figure 12:
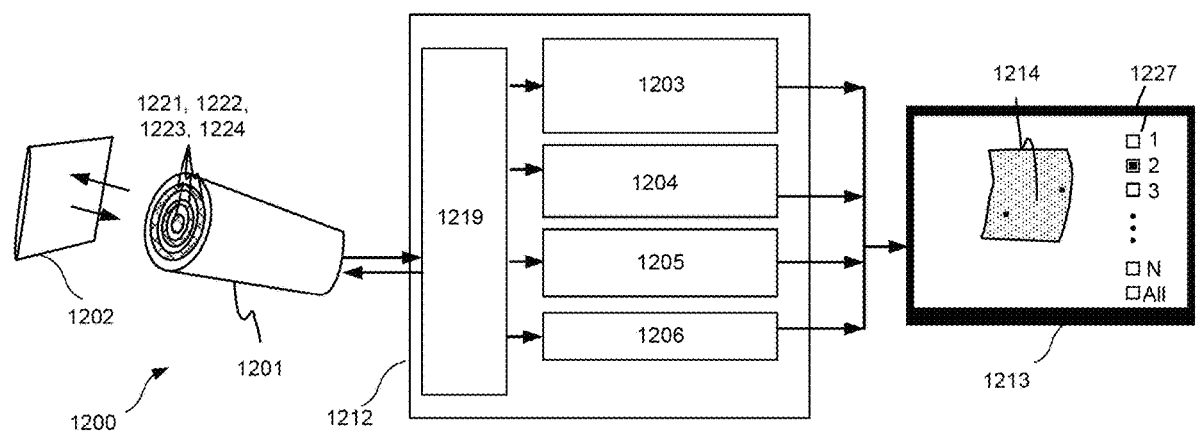
FIG. 12 depicts a sensor for inspecting surfaces.

FIG. 12 depicts sensor 1200 for inspecting surfaces 1202. It utilizes multiple optical modalities, where coherent and incoherent optical sources 1223 and components such as lasers and polarizer 1222 can be configured in various positions, either in a circular configuration, or in an arbitrary position within the sensor head 1201, combined with cameras and imaging components 1221 and single- or multi-element optical detectors 1224.

FIG. 12 is an overview of a sensor 1201. Multiple parameters are measured using i) scanning radial illumination 1203 by sequentially pulsing each light source and detecting each angle, ii) Coherent speckle illumination 1204 generated by a combination of laser diodes, and scattering media, to detect very small defects, and iii) multi-wavelength imaging 1205, where a combination of multi-wavelength LEDs are used for identifying defects in a structure surface, a surface coating, and an underlying material, and iv) polarization imaging 1206 using polarization components that are mounted in front of the camera, or using multiple adjacent cameras with polarizers oriented orthogonal to each other or at a different polarization angle from each other. The processor 1212 is composed of pre-processor 1219 to take raw sensor data, and combine the multiple inspection modalities, 1203, 1204, 1205 and 1206. Digital display 1213 shows the defect map 1214. Since multiple modalities are used, it is possible to classify each defect, and a single defect type or class, multiple defect types or classes, or all defect types or classes can be displayed by using a digital selection option 1227.

Figure 13A:
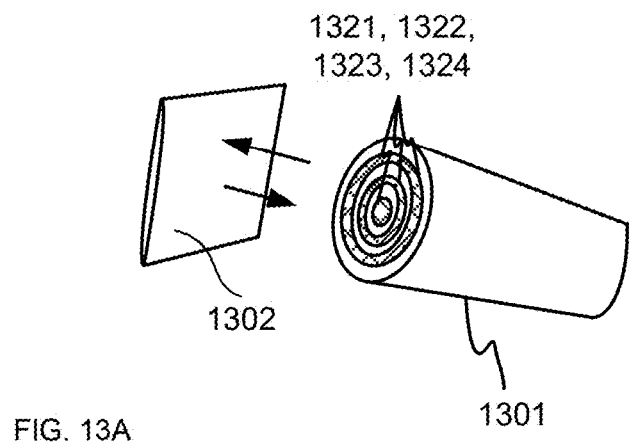
FIGS. 13A-13D depict various sensor head or inspection head configurations.
Figure 13B:
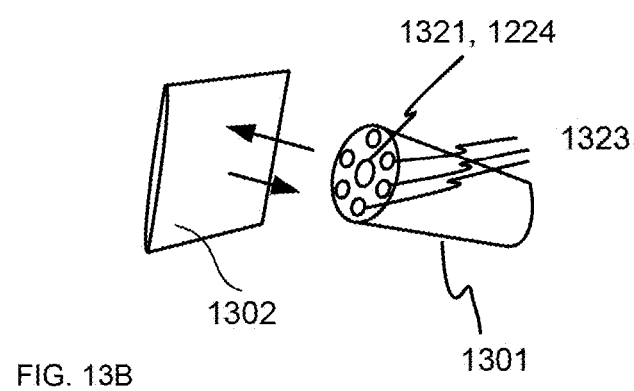
Figure 13C:
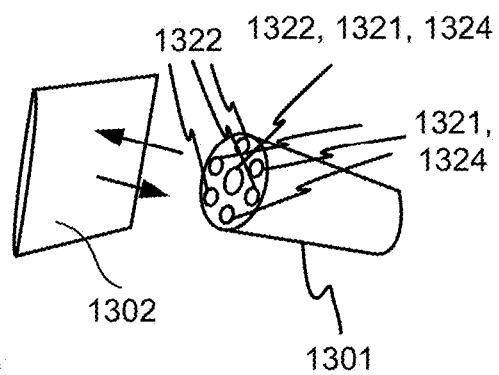
Figure 13D:
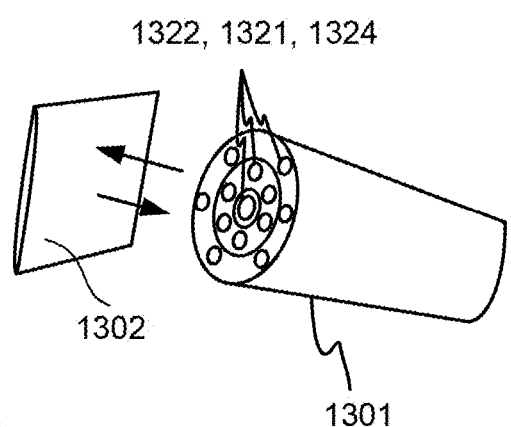

FIGS. 13A to 13D depict various sensor head or inspection head configurations 1301 for inspecting surfaces 1302. The sources 1323 and optical components such as light emitting diodes, lasers, filters and polarizers 1322, and single and multi-element detectors 1324 and imagers 1321 can be configured in various configurations. FIG. 13A depicts a generalized configuration, whereas FIGS. 13B to 13D depict example various sources and detector/image configurations.

vii) Adapting the Inspection Head to Various Surfaces

To achieve optimum inspection, an attachment is added to the sensor head to make the sensor operate optimally with a particular surface type. A generalized configuration of attaching additional optics or opto-mechanical apparatus is depicted in FIG. 14, and some examples are shown in FIGS. 15A to 15G.

Figure 14:
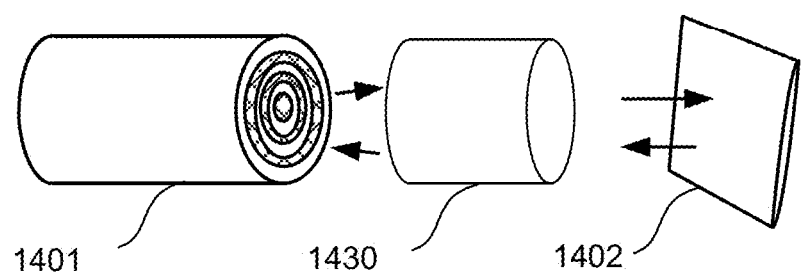
FIG. 14 depicts a generalized configuration of attaching additional optics to the sensor unit.

FIG. 14 depicts a generalized configuration of attaching additional optics 1430 and an opto-mechanical apparatus to the sensor head 1401 to enable optimal illumination and detection configuration suitable for various types of surfaces 1402.

FIGS. 15A to 15H depict various configurations of attaching additional optics and an opto-mechanical apparatus to enable optimal illumination and detection configuration suitable to various types of specimens and surfaces.

Figure 15A:
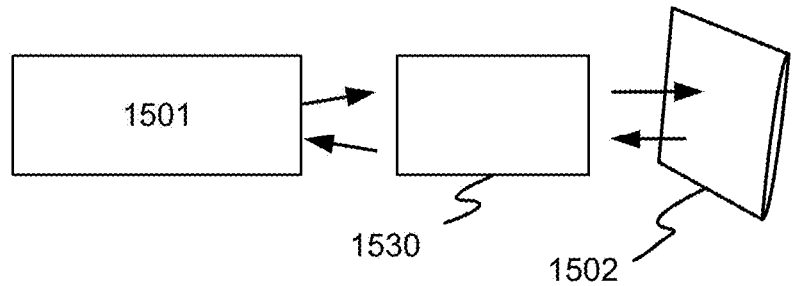
FIGS. 15A-15H depict various example configurations of attaching additional optics to the sensor unit.
Figure 15B:
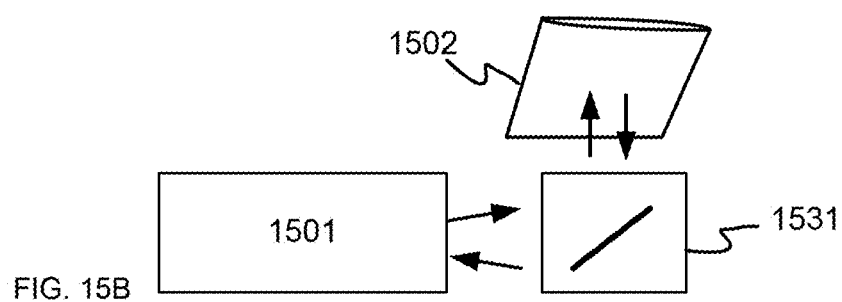
Figure 15C:
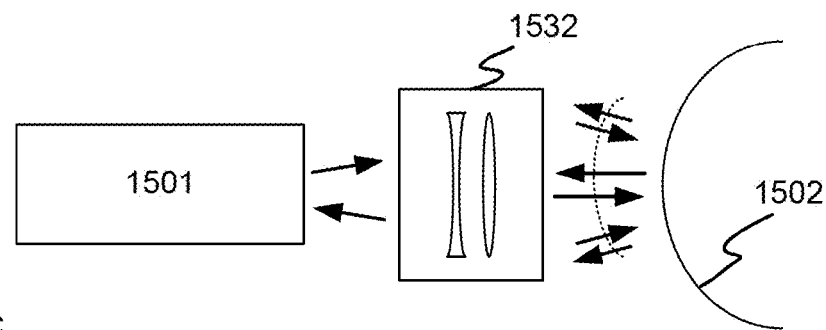
Figure 15D:
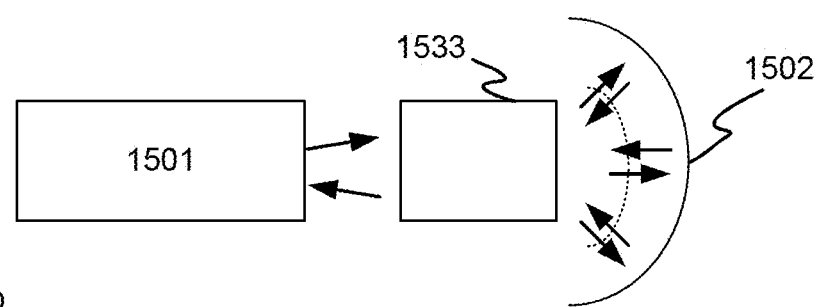
Figure 15E:
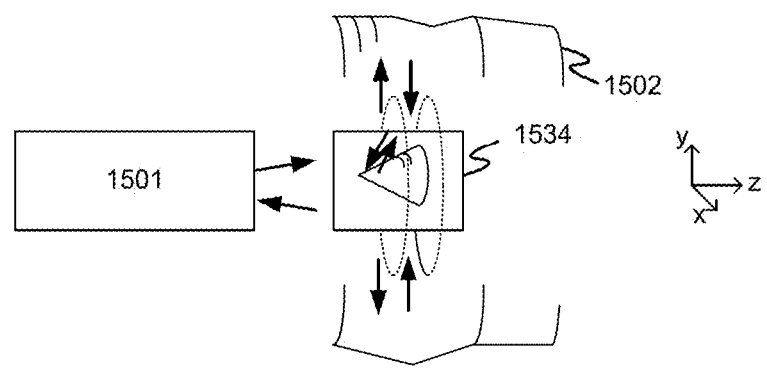
Figure 15F:
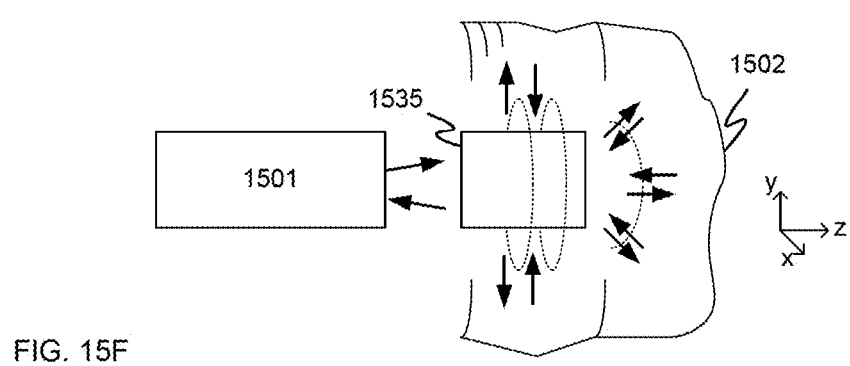
Figure 15G:
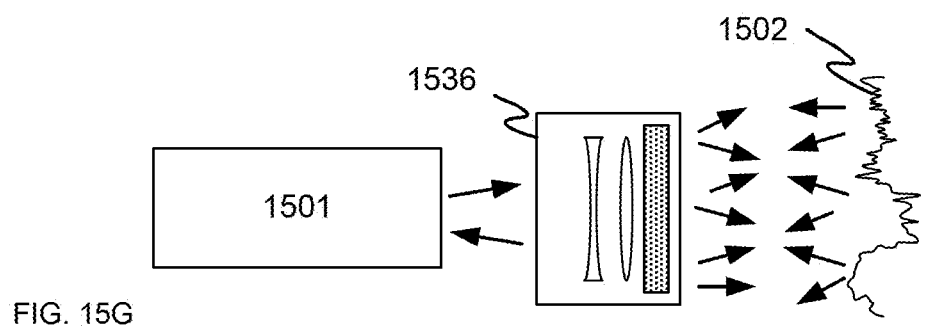
Figure 15H:
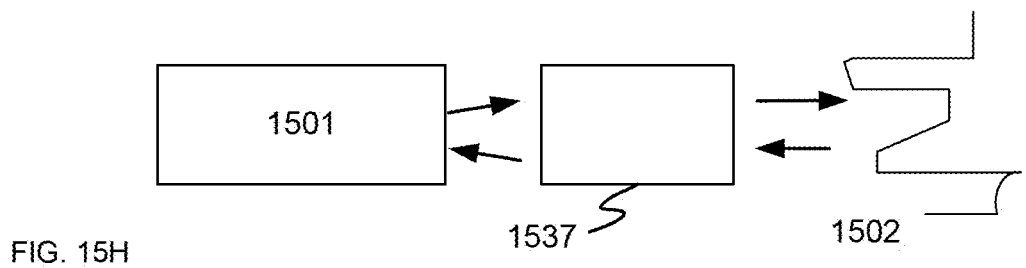

FIG. 15A depicts an example attachment 1530 to the sensor head 1501 suitable for direct incidence inspection of a surface 1502. In this case normal incidence collimating optics 1530 is utilized. FIG. 15B depicts an example attachment 1531 suitable for angled incidence inspection, such as utilizing reflective optics for directing light in a specific direction. FIG. 15C depicts an example attachment 1532 suitable for a curved or concave surface inspection, where the light coming out of the optical attachment converges towards the specimen or the surface being inspected. FIG. 15D depicts an example attachment 1533 suitable for a curved or convex surface, where the light coming out of the optical attachment diverges towards the specimen. FIG. 15E depicts an example attachment 1534 suitable for inspecting at 360 degrees in radial (xy) direction, such as for inspecting inside a hollow structure or inside a tube or a pipe. Optical components inside the attachment 1534 direct and collect light at a 360° in a radial (xy) direction. Examples include conical mirrors or rotating reflective components. FIG. 15F depicts an example attachment 1535 suitable for inspecting at 360° in a radial (xy) direction, and in axial (xz and yz) directions, such as for inspecting inside a hollow structure or a deep hole. Optical components inside the attachment 1535 direct and collect light at a 360° in a radial (xy) direction and in axial (xz and yz) directions. FIG. 15G depicts an example attachment 1536 suitable for inspecting highly diffuse, rough, or scattering surfaces, where the light coming out of the optical attachment is suitable to generate and collect diffuse illumination. A combination of refractive or diffractive, and scattering optics are utilized. FIG. 15H depicts an example attachment 1537 suitable for inspecting parts and surfaces with deep structures and variations. In this case, the attachment 1537 utilizes long-working distance optics such as a telecentric lens.

The attachment optics in FIG. 14 and FIG. 15A to 15H are composed of one or more of reflective, refractive, diffractive, scattering, or a combination thereof. These components are used to control the direction of illumination and collection to achieve optimum sensing for different types of surfaces, as depicted in the figures. In addition, polarization components, spectral filtering, and spatial filtering components are also used to optimize detection for each surface.

It should be obvious to those skilled in the art that controlling the shape of the illumination and detection in the attachment optics in FIG. 15A to FIG. 15H can be achieved by using reflective, refractive, diffractive, and scattering optics, or a combination thereof.

The word specimen in these figures refers to inspected specimen, component, part, or surface of inspection. These words are used interchangeably throughout this application. The words sensor, sensor head, inspection head, sensor or sensing unit or inspection unit are used interchangeably throughout this application and in the various figures.

viii) Combining Multiple Inspection Modalities

Figure 16:
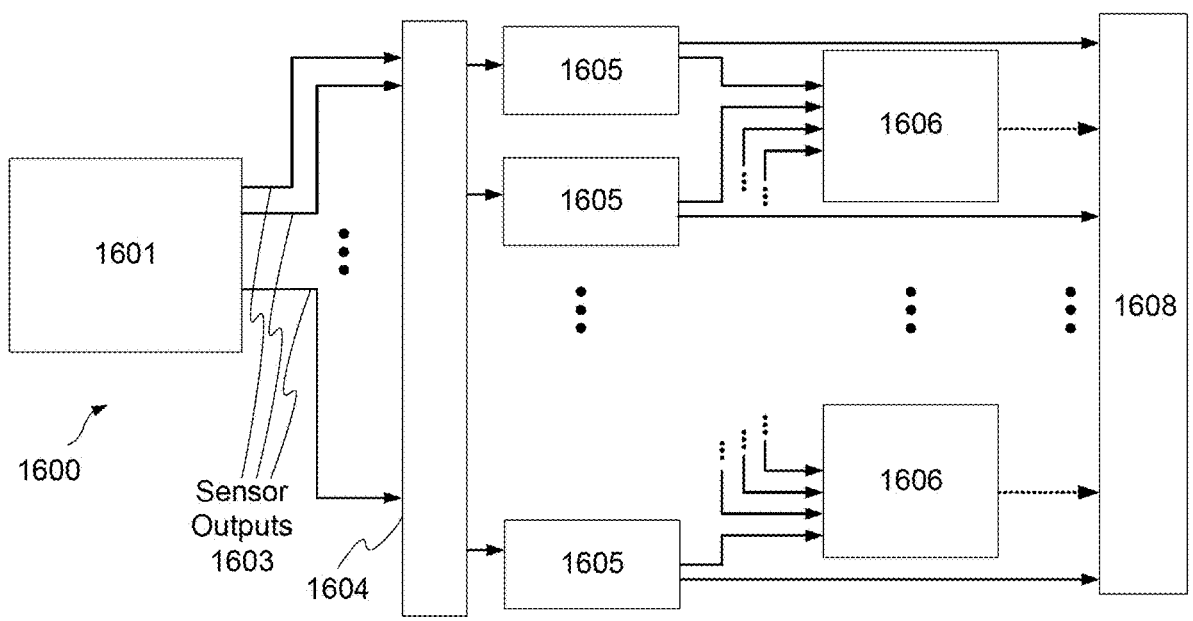
FIG. 16 is a pictorial block diagram illustrating a schematic of inspection unit for detecting defects using inspection apparatus.

FIG. 16 is a pictorial block diagram illustrating a schematic of inspection unit 1600 for detecting defects using inspection apparatus 1601. Sensor outputs 1603 send signal and image data for processing that indicate various defect parameters. The outputs are either pre-processed 1604 digitally, or the raw sensor data is used, each corresponding to various inspection modalities 1605. Inspection modalities 1605 are combined to produce a defect map either individually or by combining with other modalities 1606. These modalities include multi-angle imaging, scanning radial illumination imaging, and polarization imaging, speckle illumination imaging, modulated speckle illumination imaging, multi-wavelength imaging, and spectral and temporal imaging, or a combination thereof. The combined output generates a defect map 1608.

ix) Distortion Correction

Figure 17:
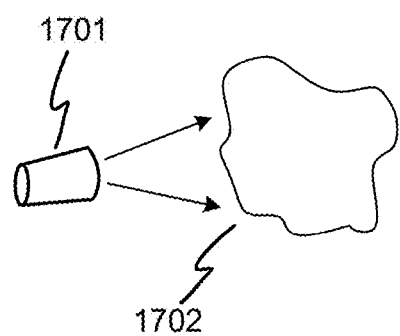
FIG. 17 is perspective pictorial and block diagrams illustrating an embodiment for a sensor head that incorporates a projection pattern for surface inspection.
Figure 18:
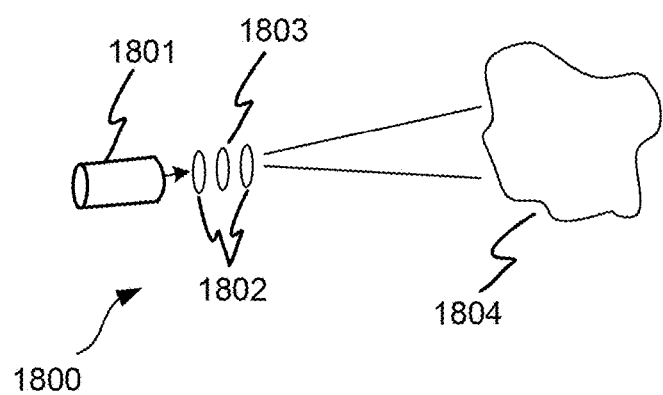
FIG. 18 is perspective pictorial and block diagrams illustrating an embodiment of a projection pattern generator for surface inspection.
Figure 21:
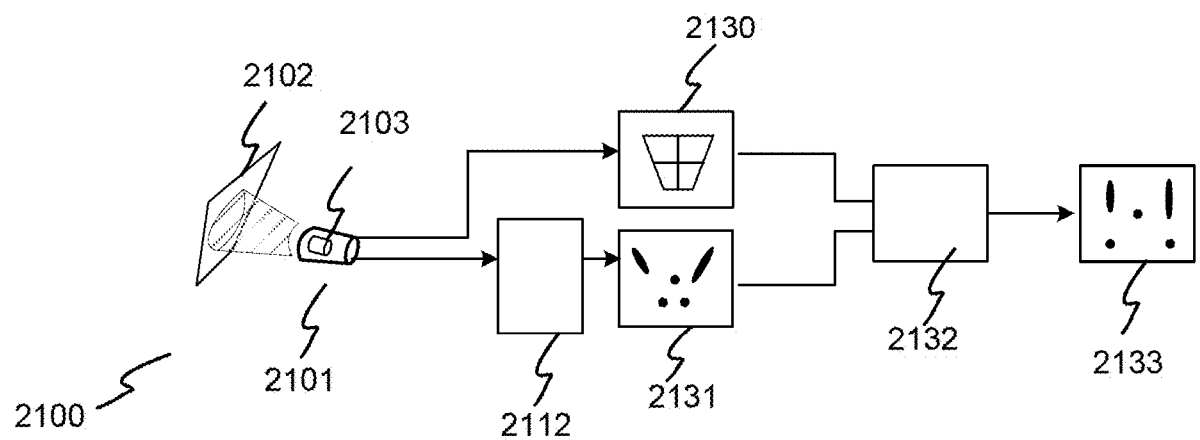
FIG. 21 is a pictorial block diagram illustrating a schematic of an inspection unit for detecting defects combined with a projected pattern for image distortion correction.
Figure 22:
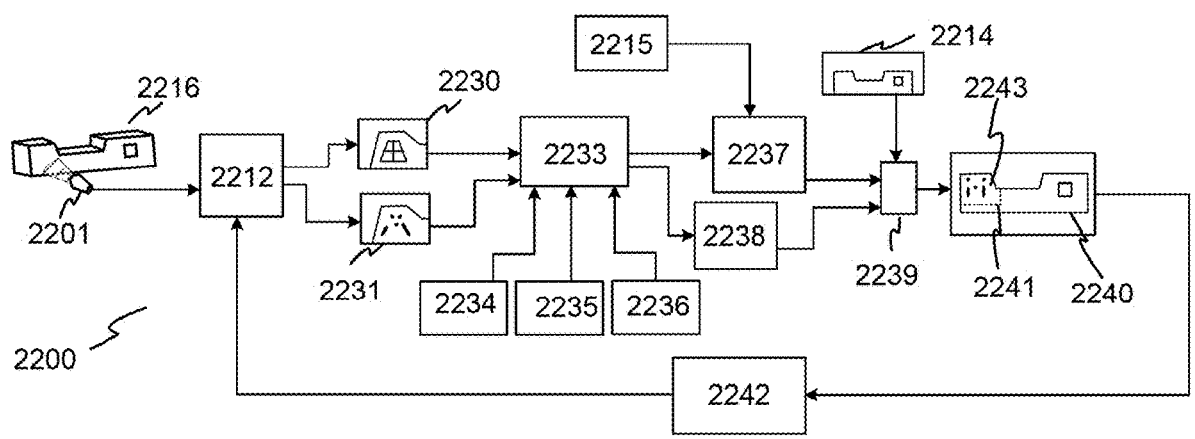
FIG. 22 is a pictorial block diagram illustrating a schematic of an inspection unit for detecting defects using an inspection apparatus combined with a projected pattern for image distortion correction, combined with a position determination to produce a defect map of the entire inspected object surface.

When the inspected surface is curved, is irregularly shaped, or if the sensor head 101 is at an angle of incidence with respect to the surface, then the defect map generated with the sensor head 101 depicted herein will be distorted. To correct for these distortions, image distortion correction is achieved by projecting a pattern onto the surface as depicted in FIG. 17, and then the image is digitally corrected. FIG. 18 illustrates a projection pattern generator for generating patterns such as those depicted in FIG. 19 onto various surfaces depicted in FIGS. 20A-20D. An image correction example is shown in FIG. 21. In some embodiments, image correction methods depicted in FIGS. 17-21 are combined with sensor head 101 position determination for distortion corrected defect mapping of the object or structure as depicted in FIG. 22.

FIG. 17 is perspective pictorial and block diagrams illustrating an embodiment for a sensor head 1701 that incorporates a projected pattern 1702 onto the inspected surface.

FIG. 18 is perspective pictorial and block diagrams illustrating an embodiment of a projection pattern generator 1800. Emission from a light source 1801 passes through optics 1802 and a pattern generation filter 1803 to produce a projected pattern 1804. In some embodiments, optical source 1801 is a laser. In other embodiments, optical source 1801 is a light emitting diode, a single mode or a multi-mode laser, a fiber-optic coupled light source, an incoherent light source, a coherent light source, or a combination thereof. Yet in other embodiments, the light source 1801 is comprised of white light, a monochromatic light, a multi-wavelength light source, including a light source emitting in ultra-violet, visible or infrared wavelengths, or a combination thereof. In some embodiments, the pattern generation filter 1803 is a diffractive optical element, a refractive optical element, a holographic optical element, a computer-generated hologram, a micro-patterned optical element, or a combination thereof. For example, a line pattern is generated either using one or more refractive cylindrical elements, or a periodic grating, or a combination of both. In some embodiments, the projected pattern 1804 contains a linear or linearly symmetric pattern. In other embodiments, the projected pattern 1804 contains a circular or circularly symmetric pattern. Yet in other embodiments, the projected pattern 1804 is a combination of a linear or linearly symmetric, and a circular or circularly symmetric shape. Yet in other embodiments, the projected pattern 1804 is of arbitrary shape or symmetry containing periodic or non-periodic shapes or a combination thereof. In some embodiments projection pattern generator 1800 uses multiple pattern generation filters 1803, such as using a combination of one refractive element to generate diffractive, or two diffractive elements, two refractive elements, or a combination thereof. For example, a line or a linear pattern is generated using a cylindrical refractive optical element and a diffractive optical element such as periodic grating to replicate the line pattern.

Figure 19:
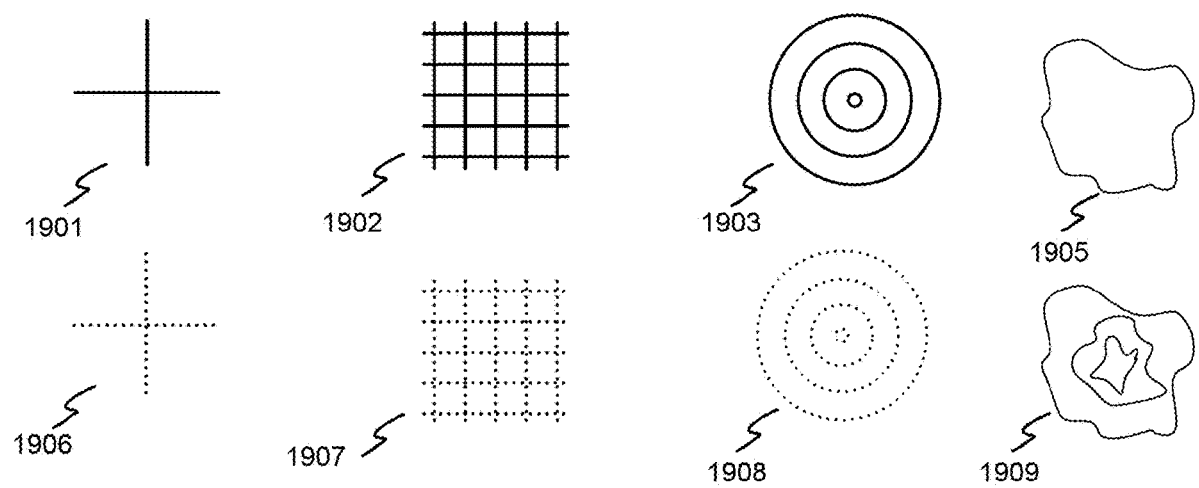
FIG. 19 depicts various projection patterns.

FIG. 19 depicts various examples of projection patterns generated by the projection pattern generator 1800 depicted in FIG. 18, such as a cross pattern 1901, a linear array 1902, a circular pattern 1903, arbitrary patterns 1905 and 1909, a dotted cross pattern 1906, a dotted linear array 1907, or a dotted circular pattern 1908 or arbitrary.

In some embodiments similar to FIG. 1D, the sensor head 101 contains a projection pattern generator 1800 depicted in FIG. 18 to enable accurate pointing and centering of the sensor head 101 towards the ground markers 125 and height markers 126.

Figure 20A:
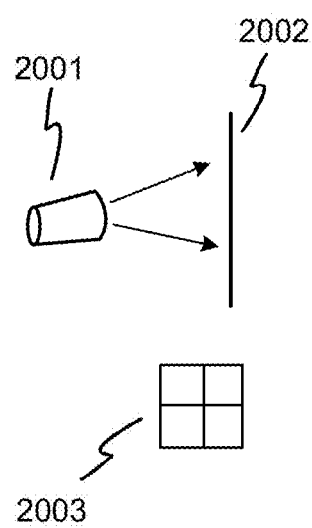
FIG. 20A is a pictorial block diagram illustrating a projected pattern onto a flat surface.

FIG. 20A is a pictorial block diagram illustrating a sensor head 2001 containing pattern generator 1800 depicted in FIG. 18 and projecting a pattern onto a flat surface 2002. When the sensor head 2001 is normal to the flat surface 2002, the projected pattern appears as an undistorted projected pattern 2003.

Figure 20B:
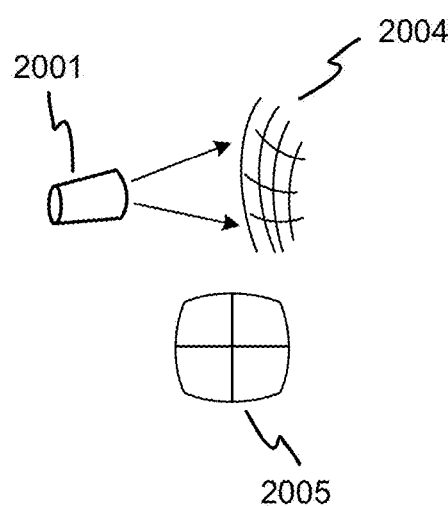
FIG. 20B is a pictorial block diagram illustrating a projected pattern onto a curved surface.

FIG. 20B is a pictorial block diagram illustrating a sensor head 2001 containing pattern generator 1800 depicted in FIG. 18 and projecting a pattern onto a curved surface 2004 that results in curved surface, distorted pattern 2005.

Figure 20C:
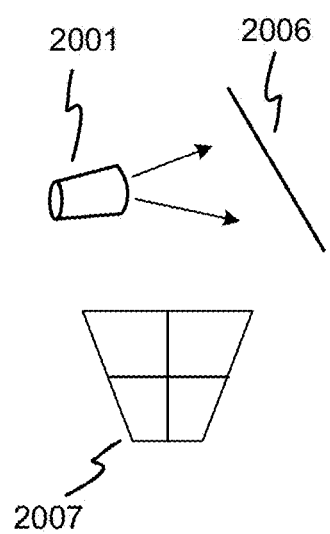
FIG. 20C is a pictorial block diagram illustrating a projected pattern onto a flat surface at an angled incidence.

FIG. 20C is a pictorial block diagram illustrating a sensor head 2001 containing pattern generator 1800 depicted in FIG. 18 and projecting a pattern onto a tilted surface 2006 that results in a tilted surface, distorted pattern 2007.

Figure 20D:
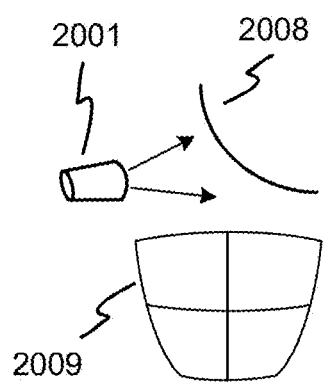
FIG. 20D is a pictorial block diagram illustrating a projected pattern onto a curved surface at an angled incidence.

FIG. 20D is a pictorial block diagram illustrating a sensor head 2001 containing pattern generator 1800 depicted in FIG. 18 and projecting pattern onto a curved and tilted surface 2008 that results in a curved and tilted distorted pattern 2009.

FIG. 21 is a pictorial block diagram illustrating a schematic of inspection unit 2100 for detecting defects combined with a projected pattern for image distortion correction. The sensor head 2101 contains pattern generator 1800 depicted in FIG. 18 that projects a pattern onto the inspected surface 2102. A camera 2103 that is attached to the sensor head 2101 detects an optical image of the projected pattern 2130. If the inspected surface 2102 is titled with respect to the sensor head 2101 normal incidence, or if is not a flat surface, then the image of the projected pattern 2130 will appear to be distorted compared to a projected pattern resulting from a flat and non-tilted surface.

The sensor head 2101 also detects and generates surface defect map 2131 using a processor as described herein and depicted in various figures, such as the processor 112 depicted in FIG. 1A. If the inspected surface 2102 is titled with respect to the sensor head 2101 normal incidence, or if is not a flat surface, then the defect map 2131 is distorted with a similar distortion as the projected pattern 2130. The distortion of the defect map 2131 is corrected using a digital distortion correction 2132 that outputs a distortion corrected defect map 2133. Distortion correction is achieved by comparing the distorted image of the projected pattern 2130 to an undistorted image stored in the memory of the digital distortion correction 2132 apparatus. The correction steps and that are utilized to correct the distortion of the projected pattern 2130 are applied to the distorted defect map 2131.

Furthermore, the size of the image of the projected pattern 2130 is dependent on the distance between the sensor head 2101 and the inspected surface 2102. When this distance is large, the detected projected pattern 2130 appears small, and when the distance is small, the detected projected pattern 2130 appears large. Therefore, the projected pattern reveals the distance between the sensor head 2101 and the inspected surface 2102. In some embodiments, the distance between the sensor head 2101 and the inspected surface 2102, measured using the projected pattern 2130 and measured using the distance measurement finder 108 depicted in FIG. 1A to 1C and discussed herein, are combined to increase the accuracy of distance measurement between the sensor head 2101 and inspected surface 2102.

In some embodiments, digital distortion correction is achieved by image transformation, such as projective image transformation, to map the distorted image to a new corrected image. It should be understood that image mapping is achieved using matrix computation and matrix transformation. In some embodiments, digital distortion correction includes distortion correction, image size correction, linear and non-linear image correction using linear algebraic calculations such as matrix multiplication, division, addition, and subtraction. In other embodiments, digital distortion correction is achieved using neural computation such as training a neural network to transform a distorted image to an expected image and applying the same computation steps to a defect map to produce a distortion free defect map.

FIG. 22 is a pictorial block diagram illustrating a schematic of inspection unit 2200 for detecting defects using inspection apparatus combined with a projected pattern for image distortion correction, combined with position determination to produce a defect map 2240 of the entire inspected object or structure 2216. The sensor head 2201 contains pattern generator 1800 depicted in FIG. 18 that projects a pattern onto the inspected surface. The sensor head 2201 is connected to control and processing electronics 2212.

At each inspection position along the surface of the object 2216, a defect map 2231 is produced by the control and processing electronics 2212. If the object surface is not flat, or if the sensor head 2201 is not normal to the object surface, then this results to a distorted defect map 2231. For the same reason, a distorted projected image 2230 is also produced. The distorted defect map 2231 and the distorted projected image 2230 are sent to an image processing and correction apparatus 2233 that performs image and defect map corrections as described herein, and produces a distortion corrected defect map 2238 for the scan area on the object 2216 that is incident on the sensor head 2201.

To produce a distortion-corrected defect map 2238, rotation and tilt correction 2234, image size correction 2235, and distortion correction 2236 are utilized in the image processing and correction apparatus 2233 by various methods described herein. The result is a distortion-corrected defect map 2238 of the field of view of the sensor head 2201.

Furthermore, inspection position data 2215 is used for an inspected area position determination 2237. Inspection position data 2215 is acquired by the methods depicted in FIGS. 1A, 1C, 1D and 1E, and described herein. In addition, a predetermined image such as composite image or a digital model 2214 of the entire object 2216 is used for inspected area position determination 2237. This position information and the distortion-corrected defect map 2238 are sent to a processor 2239 that combines position information and the defect map 2238. The output of this processor 2239 is a distortion-corrected defect map on object model 2240 that shows a distortion corrected defect map 2243 of scanned area 2241. This procedure is repeated as shown at 2242 for each section along structure 2201, thus resulting in a total object defect map that indicates the position of each defect on the surface of the object or structure 2201.

In some embodiments, image processing and correction apparatus 2233 and various processing and computing blocks depicted in FIG. 22 are composed of electronic hardware, where the processing is performed in a micro-processor. In other embodiments, image processing and correction apparatus 2233 and various processing and computing blocks depicted in FIG. 22 are composed of computing algorithm or software that are executed on computer hardware. Yet in other embodiments, image processing and correction apparatus 2233 and various processing and computing blocks depicted in FIG. 22 are composed of either electronic hardware, where the correction processing is performed in a micro-processor or a computing algorithm or software that is executed on computer hardware, or a combination thereof.

In some embodiments similar to FIGS. 17-22, the camera 2103 used to detect optical image distortion is also used for generating the defect map, as described herein.

Various Embodiments and Various Applications of the Sensor

In some embodiments, a multi-wavelength and polarization measurements are combined.

In other embodiments a camera with multi-wavelength channel outputs is used to produce multi-color or multi-wavelength images.

In other embodiments, a camera that is responsive to ultraviolet (UV) is used for detection.

In other embodiments, a camera is used that has a wide spectral response covering UV, visible and IR wavelengths.

In other embodiments, a camera with multi-wavelength such as red, green, blue, and infrared (IR) channel outputs is used to produce multi-spectral images.

In other embodiments, a monochrome light, such as a halogen lamp with a filter, light emitting diodes (LED), lasers, or a laser diodes (LD) is used as a light source.

In other embodiments, a multi-wavelength variable or tunable filter is used and combined with a broad spectral light source to produce multiple wavelength light source.

In other embodiments, an input polarizer is used for controlling incident light polarization.

In other embodiments an input polarizer followed by a wave-plate is used for controlling incident light polarization.

In other embodiments, a polarizer is used in front of the camera.

In other embodiments, a combination of input polarizer and polarizer in front of the camera are utilized.

In other embodiments, a combination of input polarizer and a wave-plate, and polarizer in front of the camera are utilized.

In other embodiments, a polarization beam splitter is used in front of the camera.

In other embodiments, an array of sources is used for illumination.

In alternative embodiments, sensor arrangements described herein are used for structure body, surface, and surface coating inspection.

In other embodiments, light sources include light emitting diodes, lasers, laser diodes, arc lamps, halogen lamps, flash lamps, fluorescent lamps, thermal sources, fiber optic sources, super luminescent light sources, or any other light source that produces, UV, visible, IR, with monochromatic (single wavelength) or polychromatic (multi-wavelength) spectral output.

In alternative embodiments, sensor arrangements described herein are used with various means of localizing the sensor head that include a wireless system, ultrasonic distance measurement and localization, and optical distance measurement.

In alternative embodiments, sensor arrangements described herein are used with various means of localizing the sensor head that include angular detection, accelerometer-based distance and movement measurement, gyroscope-based angular measurements.

In alternative embodiments, sensor arrangements described herein are used with various means of localizing the sensor head that include time-of-flight signal measurement, such as from an ultrasonic, wireless or optical sensors, pulsing, frequency shift, phase shift and Doppler effect for sensor localization.

In alternative embodiments, sensor arrangements described herein are used with various means of localizing the sensor head that include triangulation and trilateration.

In alternative embodiments, sensor arrangements described herein are used for inspection of manufactured structure parts.

In alternative embodiments, sensor arrangements described herein are used for inspection for quality assurance.

In alternative embodiments, sensor arrangements described herein are used for post fabrication inspection.

In alternative embodiments, sensor arrangements described herein are used for inspection of mobile or stationary surfaces.

In alternative embodiments, sensor arrangements described herein are used for detecting and characterizing voids, inclusions, line breakage, sag, bulging, delamination, and variations in surface finish, missing lines and fibers, and variations in fiber spacing, such as in a fiber glass body.

In alternative embodiments, sensor arrangements described herein are used for inspecting plastic and metal parts.

In alternative embodiments, sensor arrangements described herein are used for inspecting nylon and fiberglass parts.

In alternative embodiments, sensor arrangements described are used for organic, inorganic, or metallic part inspection.

In alternative embodiments, sensor arrangements described herein use single polarization state, multiple polarization states, or differential polarization, namely calculating difference in polarization states, or a combination thereof.

In alternative embodiments, sensor arrangements described herein use single polarization angle, multiple polarization angles, and use single or multiple incident angles of the polarized light, or a combination thereof.

In alternative embodiments, sensor arrangements described herein use linear, circular, or elliptical polarization states, or a combination thereof.

In alternative embodiments, sensor arrangements described herein use stationary or rotating polarizers, stationary or rotating wave plates, polarization controlling apparatus, liquid crystal-based polarization controlling apparatus, electro-optic modulator and phase shifter devices to control polarization and phase states, polymeric based electro-optic modulators and phase shifters, lithium niobate and silicon based electro-optic modulators and phase shifters, thermal polymer based electro-optic modulator and phase shifter, holographic phase shifter, or any polarization controller or phase shifters, or a combination thereof.

In alternative embodiments, sensor arrangements described herein use multiple polarization angle measurements using rotating polarizers.

In alternative embodiments, sensor arrangements described herein use multiple polarization angle measurements using multiple polarizers or polarization beam splitters.

In alternative embodiments, sensor arrangements described herein use multiple polarization angle measurements using pixelated polarizers in front of the camera.

In some embodiments, the structure being inspected may be a mobile structure, a stationary structure, or a combination thereof.

In some embodiments, the inspection is performed only in a small portion of the object under test. Yet in other embodiments, inspection is performed on an entire or a large structure. When a large structure is tested, an entire map is generated from multiple measurement using the spatial information used is achieved using the positioning system depicted in FIG. 1A.

In some embodiments, sensor data is transmitted to the central system using a wireless transmission. In other embodiments, sensor data is transmitted to the central system using a wired connection, or an optical connection or an ultrasonic connection, or a combination thereof.

In some embodiments, positioning information is generated using wireless transmitters and receivers. In other embodiments, positioning information is generated using ultrasonic transmitters and receivers. Yet in other embodiments, positioning information is generated using laser-based and optical-based transmitters and receivers. Yet in other embodiments, positioning information is generated using a combination of optical image generated by the sensor head and combined with using optical or digital image correlation with a known image of the structure under test.

In some embodiments, the sensor head depicted in FIGS. 1A, 1B FIGS. 12, 13, 14, 15, and depicted in other FIGUREs and described herein can be a hand-held, portable unit, a unit mounted on a mobile apparatus, attached to a manual, automated, or a semi-automated scanning structure, or a fixed holder.

In other embodiments, the sensor head depicted in FIGS. 1A, 1B, FIGS. 12, 13, 14, 15, and depicted in other FIGUREs and described herein can be a single unit or an array of sensor units positioned in a fixed location, and the structure is movable with respect to the sensor head or sensor unit array to achieve full-structure scan.

In other embodiments, the sensor head depicted in FIGS. 1A, 1B, FIGS. 12, 13, 14, 15, and depicted in other FIGUREs and described herein can be a single unit, or a sensor array mounted on a movable arm, a robotic arm, or an autonomous vehicle to scan the structure.

Throughout this disclosure, structure, specimen, and object are used interchangeably.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Furthermore, the term fluid/gas are meant to be used interchangeably.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant(s) reserve the right to physically incorporate into the written description or any other portion of the application, any and all such claims. Thus, for example, under no circumstances may the patent be interpreted as allegedly not providing a written description for a claim on the assertion that the precise wording of the claim is not set forth in haec verba in written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description hereinabove is not intended to limit the invention, except as indicated in the appended claims.

What is claimed is:

1. A multi-modal inspection apparatus for detecting surface and structural defects in a structure, comprising:
   a structure having a structural surface;
   a plurality of position registration devices;
   a sensor capable of moving along the structural surface for detecting surface and structural defects in the structural surface such that the sensor is located adjacent to the plurality of position registration devices,
   wherein the sensor includes a pattern projection generator for generating a pattern image on the structural surface and a camera for detecting the pattern image generated by the pattern projection generator on the structural surface;
   and
   a processor operatively connected to the sensor and the plurality of position registration devices for processing information from the sensor and the plurality of position registration devices and providing a map of any defects in the structural surface.

2. The multi-modal inspection apparatus, as in claim 1, wherein the plurality of position registration devices is further comprised of:
   an accelerometer-based sensor;
   an inertial mass sensor; or
   a magnetometer.

3. The multi-modal inspection apparatus, as in claim 1, wherein the plurality of position registration devices is further comprised of:
   a plurality of distance measurement sensors located adjacent to the sensor.

4. The multi-modal inspection apparatus, as in claim 3, wherein the plurality of position registration devices is further comprised of:
   a plurality of stationary ground makers; and
   a plurality of height markers located adjacent to the plurality of stationary ground makers,
   wherein the plurality of stationary ground makers and the plurality of height markers are located adjacent to the plurality of distance measurement sensors.

5. The multi-modal inspection apparatus, as in claim 3, wherein the plurality of distance measurement sensors is further comprised of:
   an ultrasonic range distance measurement finder;
   an optical distance measurement sensor located on the sensor;
   an accelerometer-based sensor located on the sensor;
   an inertial mass sensor located on the sensor; or
   a wireless positioning-based sensor located adjacent to the sensor.

6. The multi-modal inspection apparatus, as in claim 1, wherein the pattern projection generator is further comprised of:
   a light source;
   a plurality of optics located adjacent to the light source; and
   a pattern generation filter located adjacent to the plurality of optics.

7. The multi-modal inspection apparatus, as in claim 1, wherein the processor is further comprised of:
   an image processing and correction apparatus for performing a pattern image and structural surface defect map correction and generating a distortion corrected defect map for a surface scan area on the structure that is incident on the sensor,
   wherein the image processing and correction apparatus performs the following;
      determine if a distortion is detected in the pattern image,
      detect and generate a structural surface defect map,
      upon determining that a distortion is detected in the pattern image, perform the pattern image correction,
      upon performing the pattern image correction, perform the structural surface defect map correction, and
      generate the distortion corrected defect map for a surface scan area on the structure that is incident on the sensor based upon the pattern image correction and the structural surface defect map correction.

8. A method of constructing a multi-modal inspection apparatus for detecting surface and structural defects in a structure, comprising:
   providing a structure having a structural surface;
   providing a plurality of position registration devices;
   providing a sensor capable of moving along the structural surface for detecting surface and structural defects in the structural surface such that the sensor is located adjacent to the plurality of position registration devices,
   wherein the sensor includes a pattern projection generator for generating a pattern image on the structural surface and a camera for detecting the pattern image generated by the pattern projection generator on the structural surface;
   and
   providing a processor operatively connected to the sensor and the plurality of position registration devices for processing information from the sensor and the plurality of position registration devices and providing a map of any defects in the structural.

9. The method, as in claim 8, wherein the plurality of position registration devices is further comprised of:
   an accelerometer-based sensor;
   an inertial mass sensor; or
   a magnetometer.

10. The method, as in claim 8, wherein the plurality of position registration devices is further comprised of:
    a plurality of distance measurement sensors located adjacent to the sensor.

11. The method, as in claim 10, wherein the plurality of position registration devices is further comprised of:
    a plurality of stationary ground makers; and
    a plurality of height markers located adjacent to the plurality of stationary ground makers,
    wherein the plurality of stationary ground makers and the plurality of height markers are located adjacent to the plurality of distance measurement sensors.

12. The method, as in claim 10, wherein the plurality of distance measurement sensors is further comprised of:
    an ultrasonic range distance measurement finder;
    an optical distance measurement sensor located on the sensor;
    an accelerometer-based sensor located on the sensor;
    an inertial mass sensor located on the sensor; or
    a wireless positioning-based sensor located adjacent to the sensor.

13. The method, as in claim 8, wherein the pattern projection generator is further comprised of:
a light source;
plurality of optics located adjacent to the light source; and
a pattern generation filter located adjacent to the plurality of optics.

14. The method, as in claim 8, wherein the processor is further comprised of:
providing an image processing and correction apparatus for performing a pattern image and structural surface defect map correction and generating a distortion corrected defect map for a surface scan area on the structure that is incident on the sensor,
wherein the image processing and correction apparatus performs the following;
determine if a distortion is detected in the pattern image,
detect and generate a structural surface defect map,
upon determining that a distortion is detected in the pattern image, perform the pattern image correction,
upon performing the pattern image correction, perform the structural surface defect map correction, and
generate the distortion corrected defect map for a surface scan area on the structure that is incident on the sensor based upon the pattern image correction and the structural surface defect map correction.

15. A structural surface sensing device, comprising:
a structure having a structural surface;
a plurality of position registration devices;
a sensor capable of moving along the structural surface for detecting surface and structural defects in the structural surface such that the sensor is located adjacent to the plurality of position registration devices,
wherein the sensor includes a pattern projection generator for generating a pattern image on the structural surface and a camera for detecting the pattern image generated by the pattern projection generator on the structural surface; and
a processor operatively connected to the sensor and the plurality of position registration devices for processing information from the sensor and the plurality of position registration devices and providing a map of any defects in the structural surface.

16. The structural surface sensing device, as in claim 15, wherein the plurality of position registration devices is further comprised of:
an accelerometer-based sensor;
an inertial mass sensor; or
a magnetometer.

17. The structural surface sensing device, as in claim 15, wherein the plurality of position registration devices is further comprised of:
a plurality of distance measurement sensors located adjacent to the sensor.

18. The structural surface sensing device, as in claim 17, wherein the plurality of position registration devices is further comprised of:
a plurality of stationary ground makers; and
a plurality of height markers located adjacent to the plurality of stationary ground makers,
wherein the plurality of stationary ground makers and the plurality of height markers are located adjacent to the plurality of distance measurement sensors.

19. The structural surface sensing device, as in claim 17, wherein the plurality of distance measurement sensors is further comprised of:
an ultrasonic range distance measurement finder;
an optical distance measurement sensor located on the sensor;
an accelerometer-based sensor located on the sensor;
an inertial mass sensor located on the sensor; or
a wireless positioning-based sensor located adjacent to the sensor.

20. The structural surface sensing device, as in claim 15, wherein the processor is further comprised of:
an image processing and correction apparatus for performing a pattern image and structural surface defect map correction and generating a distortion corrected defect map for a surface scan area on the structure that is incident on the sensor,
wherein the image processing and correction apparatus performs the following;
determine if a distortion is detected in the pattern image,
detect and generate a structural surface defect map,
upon determining that a distortion is detected in the pattern image, perform the pattern image correction,
upon performing the pattern image correction, perform the structural surface defect map correction, and
generate the distortion corrected defect map for a surface scan area on the structure that is incident on the sensor based upon the pattern image correction and the structural surface defect map correction.

* * * * *